(12) United States Patent
Fujimaki et al.

(10) Patent No.: US 9,798,143 B2
(45) Date of Patent: Oct. 24, 2017

(54) HEAD MOUNTED DISPLAY, INFORMATION SYSTEM, CONTROL METHOD FOR HEAD MOUNTED DISPLAY, AND COMPUTER PROGRAM

(71) Applicant: SEIKO EPSON CORPORATION, Tokyo (JP)

(72) Inventors: Yutaka Fujimaki, Matsumoto (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 53 days.

(21) Appl. No.: 14/808,824

(22) Filed: Jul. 24, 2015

(65) Prior Publication Data

US 2016/0041388 A1 Feb. 11, 2016

(30) Foreign Application Priority Data

Aug. 11, 2014 (JP) ................................ 2014-163647
Apr. 23, 2015 (JP) ................................ 2015-088506

(51) Int. Cl.
*G06K 9/00* (2006.01)
*G02B 27/01* (2006.01)
(Continued)

(52) U.S. Cl.
CPC ....... *G02B 27/017* (2013.01); *G02B 27/0093* (2013.01); *G06F 3/011* (2013.01);
(Continued)

(58) Field of Classification Search
CPC ...... G02B 2027/0138; G02B 2027/014; G02B 2027/0178; G02B 2027/0181; G02B 27/0093; G02B 27/017; G02B 2027/0198; G06F 3/011; G06F 3/147; G06F 3/017; G06F 3/0304; G06Q 30/02;
(Continued)

(56) References Cited

U.S. PATENT DOCUMENTS

| | | | | |
|---|---|---|---|---|
| 2012/0062445 | A1* | 3/2012 | Haddick | G02B 27/017 345/8 |
| 2012/0242570 | A1* | 9/2012 | Kobayashi | G06F 3/017 345/156 |
| 2012/0294478 | A1* | 11/2012 | Publicover | G06K 9/00604 382/103 |

FOREIGN PATENT DOCUMENTS

JP 2013-521576 A 6/2013

* cited by examiner

*Primary Examiner* — Insa Sadio
(74) *Attorney, Agent, or Firm* — Oliff PLC

(57) ABSTRACT

A transmission type head mounted display includes an image display unit that displays an image and through which external scenery is transmitted, a position information acquisition unit that acquires position information of the head mounted display, a determination information acquisition unit that acquires determination information used to determine whether or not an image to be displayed on the image display unit will be displayed, an information transmission and reception unit that receives display information which is correlated with the acquired position information and includes determination information correspondence information, and a display image control unit that displays an image as the determination information correspondence information which is correlated with the acquired determination information and is included in the received display information on the image display unit in a case where the determination information is acquired.

16 Claims, 26 Drawing Sheets

(51) Int. Cl.
*G06T 19/00* (2011.01)
*G06F 3/01* (2006.01)
*G02B 27/00* (2006.01)
*G06F 3/147* (2006.01)

(52) U.S. Cl.
CPC ............... *G02B 2027/014* (2013.01); *G02B 2027/0138* (2013.01); *G02B 2027/0178* (2013.01); *G02B 2027/0181* (2013.01); *G06F 3/147* (2013.01)

(58) Field of Classification Search
CPC .. G05B 2219/23148; G05B 2219/2642; G06K 9/00671; G06T 19/006; G08C 17/02; G08C 2201/30; G08C 2201/32
See application file for complete search history.

| STORE NAME | CATEGORY | POSITION OF SIGNBOARD | | IMAGE INFORMATION | | | |
|---|---|---|---|---|---|---|---|
| | | LATITUDE | LONGITUDE | IMAGE TYPE | NUMBER OF PAGES | TIME LIMITATION | ENVIRONMENTAL LIMITATION |
| FUJI | FOOD | 130.x ⋯ xx1 | 33.y ⋯ yy1 | TEXT | 2 | 11:00 - 20:00 | CELSIUS 30 DEGREES |
| KARAOKE JO | ENTERTAINMENT | 130.x ⋯ xx2 | 33.y ⋯ yy2 | TEXT | 1 | 10:00 - 18:00<br>18:00 - 24:00 | RAIN |
| ○○ DRUGSTORE | DRUGSTORE | 130.x ⋯ xx3 | 33.y ⋯ yy3 | TEXT | 1 | NO | NO |
| ×× MEAT STORE | RETAIL | 130.x ⋯ xx4 | 33.y ⋯ yy4 | MOVING IMAGE | 1 | 10:00 - 20:00 | NO |

| ID | STAY LOCATION | | STAY FREQUENCY / MONTH | | | |
|---|---|---|---|---|---|---|
| | LATITUDE | LONGITUDE | STAY TIME / MONTH | NUMBER OF STAYS / MONTH | AVERAGE STAY TIME / STAY | CENTER AVERAGE TIME POINT |
| LOCATION A | 130.x···xx1 | 33.y···yy1 | 240 MINUTES | 2 | 120 MINUTES | 19:30 |
| LOCATION B | 130.x···xx2 | 33.y···yy2 | 120 MINUTES | 1 | 120 MINUTES | 21:00 |
| LOCATION C | 130.x···xx3 | 33.y···yy3 | 120 MINUTES | 10 | 12 MINUTES | 8:00 |
| LOCATION D | 130.x···xx4 | 33.y···yy4 | 30 MINUTES | 5 | 6 MINUTES | 18:00 |

HEAD MOUNTED DISPLAY, INFORMATION SYSTEM, CONTROL METHOD FOR HEAD MOUNTED DISPLAY, AND COMPUTER PROGRAM

BACKGROUND

1. Technical Field

The present invention relates to a head mounted display.

2. Related Art

A head mounted display (HMD) which is a display mounted on the head is known. The head mounted display generates image light by using, for example, a liquid crystal display and a light source, and guides the generated image light to the user's eyes by using a projection optical system or a light guide plate, thereby causing the user to visually recognize a virtual image. Regarding the head mounted display, there are two types including a transmission type in which a user can visually recognize external scenery in addition to a virtual image and a non-transmission type in which the user cannot visually recognize the external scenery. The transmission type head mounted display includes an optical transmission type display and a video transmission type display.

JP-T-2013-521576 discloses an HMD which displays an advertisement correlated with a specific object which is related to a position of a user of the HMD as an augmented reality image.

However, in the technique disclosed in JP-T-2013-521576, there is a need to improve a user's convenience since there is a case where an advertisement correlated with a specific object which is not visually recognized by the user is not displayed or a case where an unnecessary advertisement is displayed to the user even if the advertisement is visually recognized. In addition, in the HMD of the related art, miniaturization or the like of the HMD is desirable.

SUMMARY

An advantage of some aspects of the invention is to solve at least a part of the problems described above, and the invention can be implemented as the following forms or application examples.

(1) An aspect of the invention provide a transmission type head mounted display. The head mounted display includes: an image display unit that displays an image and through which external scenery is transmitted; a position information acquisition unit that acquires position information of the head mounted display; a determination information acquisition unit that acquires determination information used to determine whether or not an image to be displayed on the image display unit will be displayed; an information transmission and reception unit that receives display information which is correlated with the acquired position information and includes determination information correspondence information; and a display image control unit that displays an image as the determination information correspondence information which is correlated with the acquired determination information and is included in the received display information on the image display unit in a case where the determination information is acquired. According to the head mounted display of this aspect, since a user can visually recognize display information based on a specified position and an image as determination information correspondence information based on determination information, and an unnecessary image is not displayed on the image display unit, a user's convenience is improved.

(2) In the head mounted display according to the aspect described above, the determination information acquisition unit may include an image detection portion that detects an identification target image as the determination information included in the display information from the external scenery, and the display image control unit may display the determination information correspondence information on the image display unit in a case where the identification target image is detected. According to the head mounted display of this aspect, a user of the head mounted display can visually recognize an identification target image and an image as determination information correspondence information correlated with the identification target image, and thus a user's convenience is improved.

(3) In the head mounted display according to the aspect described above, the image detection portion may image the external scenery, and in a case where the identification target image is detected from the imaged external scenery, the display image control unit may display the determination information correspondence information correlated with the detected identification target image on the image display unit. According to the head mounted display of this aspect, since an image as determination information correspondence information correlated with an identification target image which is not imaged is not displayed, a user can visually recognize an image as determination information correspondence information correlated with only a signboard which is visually recognized by the user, and thus an image as unnecessary determination information correspondence information is not visually recognized. Therefore, it is possible to improve a user's convenience.

(4) In the head mounted display according to the aspect described above, the image detection portion may specify a direction of the image display unit, and in a case where the identification target image is detected from the external scenery on the basis of the specified direction of the image display unit, the display image control unit may display the determination information correspondence information correlated with the detected identification target image on the image display unit. According to the head mounted display of this aspect, a user can visually recognize an image as determination information correspondence information correlated with an identification target image located in a visual line direction of the user and does not visually recognize an image as unnecessary determination information correspondence information correlated with an identification target image which is not located in the visual line direction, and thus a user's convenience is further improved.

(5) In the head mounted display according to the aspect described above, the head mounted display may further include a distance measurement unit that measures a distance between a position of the head mounted display specified by the acquired position information and a position of a signboard which is a base of the detected identification target image, and the display image control unit may set a display aspect of an image as the determination information correspondence information to be displayed on the image display unit on the basis of the measured distance. According to the head mounted display of this aspect, a user of the head mounted display can recognize a position of a signboard on the basis of not only the position of the real signboard which is visually recognized but also an image as determination information correspondence information displayed on the image display unit, and thus a user's convenience is further improved.

(6) In the head mounted display according to the aspect described above, the display image control unit may set at least one of a size and a display position of an image as a display aspect of the image as the determination information correspondence information to be displayed on the image display unit. According to the head mounted display of this aspect, a user of the head mounted display can recognize a distance to a position of a signboard on the basis of the size of an image as determination information correspondence information or a display position, and can thus more easily recognize the distance to the position of the signboard.

(7) In the head mounted display according to the aspect described above, the head mounted display may further include a state detection unit that detects an external environmental state of the head mounted display, and the display image control unit may display an image as the determination information correspondence information correlated with the detected external environmental state on the image display unit. According to the head mounted display of this aspect, since an image as determination information correspondence information obtained by taking into consideration an external environment of the head mounted display is displayed on the image display unit, a user can recognize information suitable for a situation of a corresponding location, and thus a user's convenience is further improved.

(8) In the head mounted display according to the aspect described above, the head mounted display may further include a correction unit that displays a specific image on the image display unit, detects an image of a specific target object in the external scenery, and corrects a positional relationship between the image displayed on the image display unit and the target object on the basis of the specific image and the image of the specific target object, and the display image control unit may change an image as the determination information correspondence information displayed on the image display unit on the basis of a position of the image of the specific target object detected in the external scenery after the correction unit performs correction. According to the head mounted display of this aspect, since a real specific target object overlaps a specific image displayed on the image display unit, a user can recognize that the specific target object and the specific image are located in the same space, and thus a user's convenience in performing an operation is improved.

(9) In the head mounted display according to the aspect described above, the head mounted display may further include a personal information storage unit that stores personal information, and the display image control unit may display, on the image display unit, an image as the determination information correspondence information which is set on the basis of personal information of a user. According to the head mounted display of this aspect, since an image as determination information correspondence information obtained by also taking into consideration personal information related to a user of the head mounted display is displayed on the image display unit, the user can visually recognize information suitable for a user's preferences, and thus a user's convenience is further improved.

(10) In the head mounted display according to the aspect described above, the personal information of the user may be information regarding a location at which the user stayed in the past. According to the head mounted display of this aspect, since an image obtained by also taking into consideration a location at which a user of the head mounted display stayed in the past is displayed on the image display unit, the user can preferentially recognize information regarding a location with a high stay frequency to information regarding other locations, and thus a user's convenience is further improved.

(11) In the head mounted display according to the aspect described above, the determination information acquisition unit may acquire at least one of information regarding a location at which the user stayed in the past, biological information of the user, and statistical information of other users as the determination information. According to the head mounted display of this aspect, even if an identification target image is not detected, a user can visually recognize an image as determination information correspondence information based on determination information other than position information and an image, and thus a user's convenience is further improved.

(12) Another aspect of the invention provides a transmission type head mounted display. The head mounted display includes: an image display unit that displays an image and through which external scenery is transmitted; a position information acquisition unit that acquires position information of the head mounted display; an advertisement information storage unit that stores display information including an image as determination information correspondence information to be displayed on the image display unit; a determination information acquisition unit that acquires determination information used to determine whether or not an image as the determination information correspondence information will be displayed; and a display image control unit that displays an image as the determination information correspondence information which is correlated with the acquired determination information on the image display unit in a case where the determination information is acquired. According to the head mounted display of this aspect, since transmission and reception of information with other information storage devices are not performed, a user's convenience can be improved, and the head mounted display can be miniaturized.

(13) Still another aspect of the invention provides a transmission type head mounted display. The head mounted display includes: an image display unit that displays an image and through which external scenery is transmitted; a determination information acquisition unit that acquires determination information used to determine whether or not an image to be displayed on the image display unit will be displayed; an information transmission and reception unit that receives display information which includes determination information correspondence information; and a display image control unit that displays, on the image display unit, an image as the determination information correspondence information which is correlated with the acquired determination information in the determination information correspondence information included in the display information in a case where the determination information is acquired. According to the head mounted display of this aspect, since an image as determination information correspondence information is displayed on the basis of an acquired determination target and received display information even if there is no position information of the head mounted display, a user's convenience can be improved.

All of the plurality of constituent elements in the respective aspects of the invention described above are not essential, and some of the plurality of constituent elements may be changed, deleted, exchanged with other new constituent elements, and partially deleted from limited content thereof, as appropriate, in order to solve some or all of the above-described problems or in order to achieve some or all of the effects described in the present specification. In addition, in order to solve some or all of the above-described problems or in order to achieve some or all of the effects described in the present specification, some or all of the technical features included in one aspect of the invention described above may be combined with some or all of the technical features included in another aspect of the invention described above, and as a result may be treated as an independent aspect of the invention.

For example, one aspect of the invention may be implemented as a device which includes one or two or more of the five constituent elements including the image display unit, the position specifying unit, the determination information acquisition unit, the information transmission and reception unit, and the display image control unit. In other words, this device may or may not include the image display unit. The device may or may not include the determination information acquisition unit. The device may or may not include the position information acquisition unit. The device may or may not include the information transmission and reception unit. The device may or may not include the display image control unit. For example, the image display unit may display an image and may transmit external scenery therethrough. For example, the position information acquisition unit may acquire position information of the head mounted display. For example, the determination information acquisition unit may acquire determination information used to determine whether or not an image to be displayed on the image display unit will be displayed. For example, the information transmission and reception unit may receive display information which is correlated with the specified position information and includes determination information correspondence information. For example, the display image control unit may display an image as the determination information correspondence information which is correlated with the acquired determination information and is included in the received display information on the image display unit in a case where the determination information is acquired. This device may be implemented as, for example, a head mounted display, but may be implemented as devices other than the head mounted display. According to such an aspect, it is possible to achieve at least one advantage for example improvement and simplification of operability of the device, integration of the device, and improvement in convenience for a user using the device. Some or all of the above-described technical features of each aspect of the head mounted display are applicable to the device.

The invention may be implemented in various aspects other than the head mounted display. For example, the invention may be implemented in aspects such as a control method for a head mounted display, an information system including the head mounted display, a computer program for implementing the control method for a head mounted display and the information system, a recording medium recording the computer program thereon, and data signals which include the computer program and are embodied in carrier waves.

BRIEF DESCRIPTION OF THE DRAWINGS

The invention will be described with reference to the accompanying drawings, wherein like numbers reference like elements.

FIG. 3 is a list table illustrating an example of advertisement information correlated with a signboard image stored in an advertisement DB of the server.

FIG. 5 is a list table illustrating an example of stay information of a user of the HMD.

DESCRIPTION OF EXEMPLARY EMBODIMENTS

A. First Embodiment

A-1. Configuration of Information System

Figure 1:
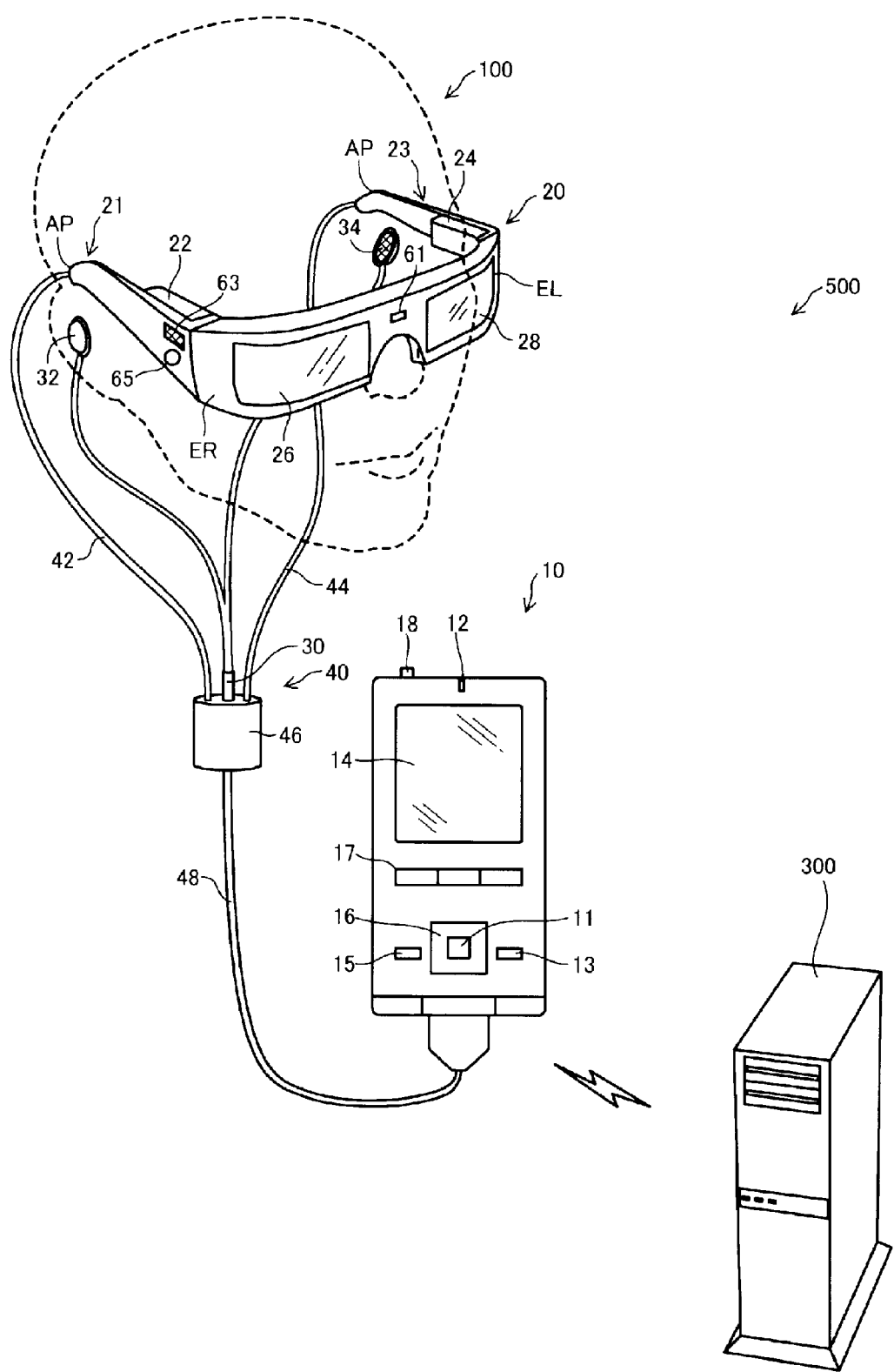
FIG. 1 is a diagram illustrating a schematic configuration of an information system according to a first embodiment of the invention.

FIG. 1 is a diagram illustrating a schematic configuration of an information system 500 according to a first embodiment of the invention. The information system 500 includes a head mounted display 100 (an HMD 100) which is mounted on the head of a user and allows the user to visually recognize a virtual image; and a server 300 which stores advertisement information including information regarding a signboard installed at each location, position information for specifying a position of the signboard, and image information correlated with the signboard, in relation to an information terminal such as the HMD 100. In the information system 500, the advertisement information stored in the server 300 is transmitted from the server 300 to the HMD 100 on the basis of various information pieces detected by the HMD 100. In the information system 500 of the present embodiment, each of the HMD 100 and the server 300 is provided alone, but, in other embodiments, at least one of the HMD 100 and the server 300 may be provided in plurality.

Figure 2:
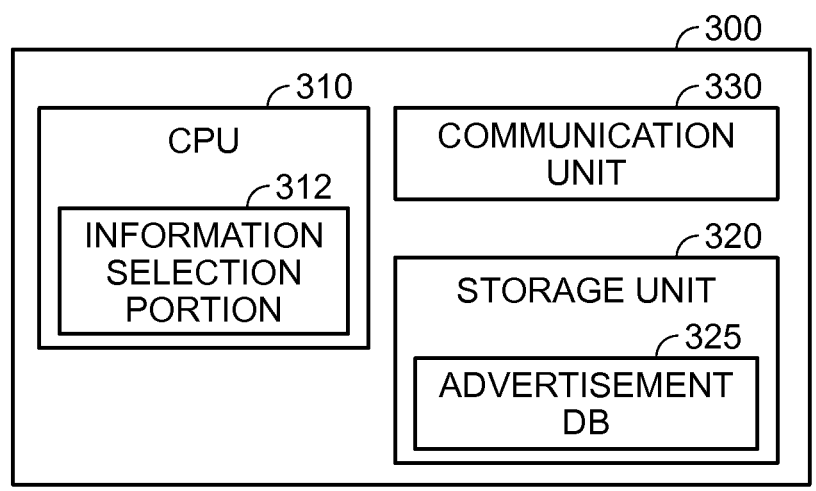
FIG. 2 is a functional block diagram illustrating a configuration of a server.

FIG. 2 is a functional block diagram illustrating a configuration of the server 300. The server 300 includes a storage unit 320 which stores advertisement information to be transmitted to the HMD 100, a communication unit 330 which transmits at least a part of the advertisement information stored in the storage unit 320 to the HMD 100, and a CPU 310. The storage unit 320 is constituted of a ROM or a RAM. The storage unit 320 includes an advertisement database 325 (advertisement DB 325) which stores an image of a signboard and advertisement information correlated with the image of the signboard. Details of the advertisement information stored in the advertisement DB 325 will be described later. The storage unit 320 stores various computer programs.

The communication unit 330 performs wireless communication with other apparatuses in accordance with a predetermined wireless communication method such as a wireless LAN or Bluetooth (registered trademark). The communication unit 330 performs transmission and reception of various information pieces between the server 300 and the HMD 100. The CPU 310 reads the computer program stored in the storage unit 320 and executes the computer program. The CPU 310 includes an information selection portion 312 which selects at least a part of the advertisement information stored in the advertisement DB 325 on the basis of information such as position information of an image display section 20 of the HMD 100, received via the communication unit 330, or an image captured by a camera 61 which is provided on the HMD 100 and images external scenery. A method of specifying a position or the like of the image display section 20 will be described later. The information selection portion 312 transmits selection information which is part of the selected advertisement information to the HMD 100 via the communication unit 330. The server 300 in the present embodiment corresponds to an information storage device in the appended claims, and the communication unit 330 of the server 300 corresponds to a selection information transmission unit in the appended claims.

FIG. 3 is a list table illustrating an example of advertisement information which is correlated with each signboard image stored in the advertisement DB 325 of the server 300. FIG. 3 shows store-based advertisement data SD which is a part of the advertisement information stored in the advertisement DB 325. The store-based advertisement data SD is divided into a category, a signboard position, and image information for each named store. As details thereof will be described later, selection information to be transmitted from the server 300 to the HMD 100 is selected from the advertisement information on the basis of the category and the signboard position. A display aspect or the like of an image to be displayed on the HMD 100 is set on the basis of image information correlated with the selection information which has been transmitted from the server 300.

Hereinafter, details of information regarding the store-based advertisement data SD will be described. For example, as illustrated in FIG. 3, the category of a store having the name "Fuji" belongs to food, and the category of a store having the name "Karaoke JO" belongs to entertainment. The signboard position in the store-based advertisement data SD specifies the latitude and longitude of a location where a signboard is placed. For example, the latitude and longitude of a signboard of the store having the name "Fuji" are respectively "130.x . . . xx1" and "33.y . . . yy1".

The image information in the store-based advertisement data SD is divided into the type of image, the number of pages, time limitation, and environmental limitation. The type of image is the type of image which is displayed on the HMD 100. For example, the type of image of the store having the name "Fuji" is a "text" type image (simply also referred to as a "text image"). The text image does not change even with the passage of time when displayed on the HMD 100, and is a still image represented as text. The type of image of the store name "XX meat store" is a "moving image", and the moving image is an image which changes with the passage of time when displayed on the HMD 100. The number of pages indicates a hierarchical structure of an image displayed on the HMD 100. For example, the number of pages of the store having the name "Fuji" is "2", and thus an image thereof has a two-hierarchy structure. For this reason, one type of image is displayed on the HMD 100 at a specific point of time, but if a predetermined operation is received, the image displayed on the HMD 100 is changed to another type of image. The number of pages of the store having the name "Karaoke JO" is "1", and one type of image is displayed on the HMD 100.

The time limitation is a setting of a period during which an image is displayed on the HMD 100. For example, since the time limitation of the store having the name "Fuji" is from 11:00 to 20:00, a period in which an image correlated with "Fuji" is displayed on the HMD 100 is limited to a period from 11:00 to 20:00, and the image correlated with "Fuji" is not displayed in the remaining period. The time limitation of the store having the name "Karaoke JO" includes two periods from 10:00 to 18:00 and from 18:00 to 24:00. For this reason, an image correlated with "Karaoke JO", displayed on the HMD 100 in a period from 10:00 to 18:00 is different from an image correlated with "Karaoke JO", displayed on the HMD 100 in a period from 18:00 to 24:00. Since there is no time limitation in a store having the name "OO drugstore", the same image is displayed on the HMD 100 24 hours a day.

The environmental limitation is a setting of an external environment of the HMD 100 in relation to a condition for changing an image displayed on the HMD 100. For example, the environmental limitation of the store having the name "Fuji" is that an external temperature is "Celsius 30 degrees (30° C.)", and thus an image displayed on the HMD 100 differs with 30° C. as a boundary. The environmental limitation of the store having the name "Karaoke JO" is "rain", and thus an image displayed on the HMD 100 differs in a case where it is rainy and in a case where it is not rainy. The environmental limitation of the store having the name "OO drugstore" is "no", and thus an image displayed on the HMD 100 is not changed regardless of an external environment.

The HMD 100 illustrated in FIG. 1 is an optical transmission type head mounted display which allows a user to visually recognize a virtual image and also to directly visually recognize external scenery. In the present specification, for the sake of convenience, a virtual image which the HMD 100 allows the user to visually recognize is also referred to as a "display image". In addition, the HMD 100 emitting image light on the basis of image data such as content is also referred to as "displaying an image".

The HMD 100 includes the image display section 20 which enables a user to visually recognize a virtual image in a state of being mounted on the head of the user, and a control section 10 (a controller 10) which controls the image display section 20.

The image display section 20 is a mounting body which is mounted on the head of the user, and has a spectacle shape in the present embodiment. The image display section 20 includes a right holding unit 21, a right display driving unit 22, a left holding unit 23, a left display driving unit 24, a right optical image display unit 26, a left optical image display unit 28, a camera 61, a microphone 63, and a thermometer 65. The right optical image display unit 26 and the left optical image display unit 28 are disposed so as to be located in front of the eyes of the user when the user wears the image display section 20. One end of the right optical image display unit 26 and one end of the left optical image display unit 28 are connected to each other at the position corresponding to the glabella of the user when the user wears the image display section 20.

The right holding unit 21 is a member which is provided so as to extend over a position corresponding to the temporal region of the user from an end part ER which is the other end of the right optical image display unit 26 when the user wears the image display section 20. Similarly, the left holding unit 23 is a member which is provided so as to extend over a position corresponding to the temporal region of the user from an end part EL which is the other end of the left optical image display unit 28 when the user wears the image display section 20. The right holding unit 21 and the left holding unit 23 hold the image display section 20 on the head in the same manner as in the temples of spectacles.

The right display driving unit 22 and the left display driving unit 24 are disposed on a side opposing the head of the user when the user wears the image display section 20. Hereinafter, the right holding unit 21 and the left holding unit 23 are collectively simply referred to as "holding units", the right display driving unit 22 and the left display driving unit 24 are collectively simply referred to as "display driving units", and the right optical image display unit 26 and the left optical image display unit 28 are collectively simply referred to as "optical image display units".

The display driving units 22 and 24 respectively include liquid crystal displays 241 and 242 (hereinafter, referred to as an "LCDs 241 and 242"), projection optical systems 251 and 252, and the like (refer to FIG. 4). Details of configurations of the display driving units 22 and 24 will be described later. The optical image display units 26 and 28 as optical members include light guide plates 261 and 262 (refer to FIG. 4) and dimming plates. The light guide plates 261 and 262 are made of light transmissive resin material or the like and guide image light which is output from the display driving units 22 and 24 to the eyes of the user. The dimming plate is a thin plate-shaped optical element, and is disposed to cover a surface side of the image display section 20 which is opposite to the user's eye side. The dimming plate protects the light guide plates 261 and 262 so as to prevent the light guide plates 261 and 262 from being damaged, contaminated, or the like. In addition, the light transmittance of the dimming plates is adjusted so as to adjust an amount of external light entering the eyes of the user, thereby controlling an extent of visually recognizing a virtual image. The dimming plate may be omitted.

The camera 61 is disposed at the position corresponding to the glabella of the user when the user wears the image display section 20. The camera 61 captures an image of external scenery which is an external view in a visual line direction of the user in a state in which the user wears the image display section 20, thereby obtaining a captured image. The camera 61 of the present embodiment is set to an angle of view which is substantially the same as a visual field of the user. The camera 61 is a monocular camera, but may be stereo camera. The microphone 63 is a device which acquires external sound. The microphone 63 is disposed on a side opposite (outside) to a side facing the user in the right display driving unit 22 when the user wears the image display section 20. The thermometer 65 measures a temperature (Celsius) of the external environment. The thermometer 65 corresponds to a state detection unit in the appended claims.

The image display section 20 further includes a connection unit 40 which connects the image display section 20 to the control section 10. The connection unit 40 includes a main body cord 48 connected to the control section 10, a right cord 42, a left cord 44, and a connection member 46. The right cord 42 and the left cord 44 are two cords into which the main body cord 48 branches out. The right cord 42 is inserted into a casing of the right holding unit 21 from an apex AP in the extending direction of the right holding unit 21, and is connected to the right display driving unit 22. Similarly, the left cord 44 is inserted into a casing of the left holding unit 23 from an apex AP in the extending direction of the left holding unit 23, and is connected to the left display driving unit 24. The connection member 46 is provided at a branch point of the main body cord 48, the right cord 42, and the left cord 44, and has a jack for connection of an earphone plug 30. A right earphone 32 and a left earphone 34 extend from the earphone plug 30.

The image display section 20 and the control section 10 transmit various signals via the connection unit 40. An end part of the main body cord 48 on an opposite side to the connection member 46, and the control section 10 are respectively provided with connectors (not illustrated) fitted to each other. The connector of the main body cord 48 and the connector of the control section 10 are fitted into or released from each other, and thus the control section 10 is connected to or disconnected from the image display section 20. For example, a metal cable or an optical fiber may be used as the right cord 42, the left cord 44, and the main body cord 48.

The control section 10 is a device used to control the HMD 100. The control section 10 includes a determination key 11, a lighting unit 12, a display changing key 13, a track pad 14, a luminance changing key 15, a direction key 16, a menu key 17, and a power switch 18. The determination key 11 detects a pushing operation, so as to output a signal for determining content operated in the control section 10. The lighting unit 12 indicates an operation state of the HMD 100 by using a light emitting state thereof. The operation state of the HMD 100 includes, for example, ON and OFF power states, or the like. For example, an LED is used as the lighting unit 12. The display changing key 13 detects a pushing operation so as to output a signal for changing a content moving image display mode between 3D and 2D. The track pad 14 detects an operation of the finger of the user on an operation surface of the track pad 14 so as to output a signal based on detected content. Various track pads of a capacitance type, a pressure detection type, and an optical type may be employed as the track pad 14. The luminance changing key 15 detects a pushing operation so as to output a signal for increasing or decreasing a luminance of the image display section 20. The direction key 16 detects a pushing operation on keys corresponding to vertical and horizontal directions so as to output a signal based on detected content. The power switch 18 detects a sliding operation of the switch so as to change a power supply state of the HMD 100.

Figure 4:
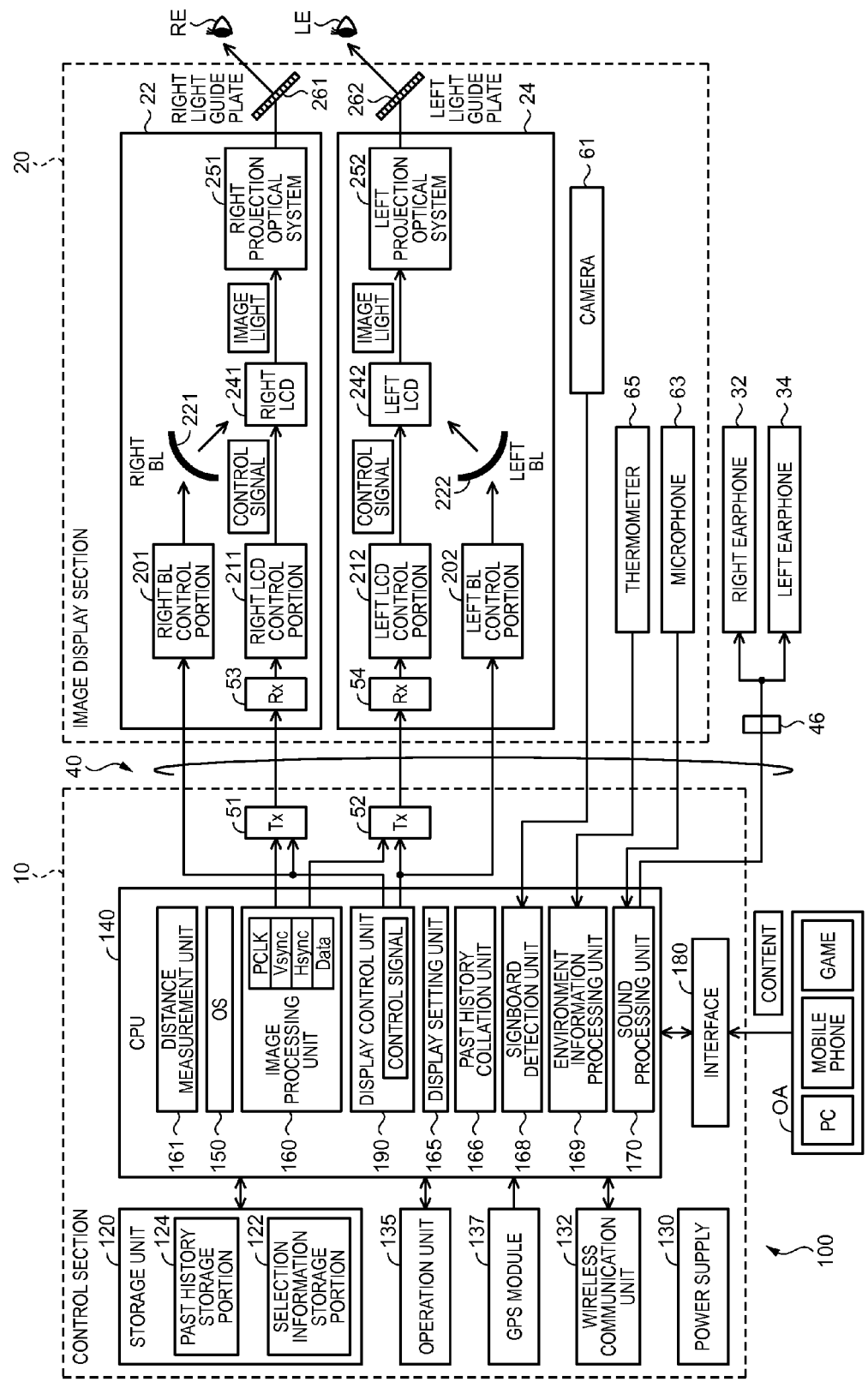
FIG. 4 is a functional block diagram illustrating a configuration of an HMD.

FIG. 4 is a functional block diagram illustrating a configuration of the HMD 100. As illustrated in FIG. 4, the control section 10 includes a storage unit 120, a power supply 130, a GPS module 137, a wireless communication unit 132, an operation unit 135, a CPU 140, an interface 180, a transmission unit 51 (Tx 51), and a transmission unit 52 (Tx 52).

The GPS module 137 receives a signal from a GPS satellite so as to specify the present position of the image display section 20 and to generate position information indicating the position of the image display section 20. In other words, the GPS module 137 specifies a position of the HMD 100 including the image display section 20. If the present position of the image display section 20 is specified, the present position of the user wearing the HMD 100 is specified. The GPS module 137 corresponds to a position specifying unit in the appended claims.

The wireless communication unit 132 performs wireless communication with other apparatuses in accordance with a predetermined wireless communication standard such as a wireless LAN or Bluetooth (registered trademark). The wireless communication unit 132 transmits the position information of the image display section 20, specified by the GPS module 137, to the communication unit 330 of the server 300. If the communication unit 330 receives the position information of the image display section 20, the information selection portion 312 of the server 300 stores the position information in the advertisement DB 325 of the storage unit 320 and also selects an image of a signboard and advertisement information at a signboard position (FIG. 3) within a predetermined distance from the specified present position of the image display section 20. The communication unit 330 transmits information in which the image of the signboard correlated with the signboard position selected by the information selection portion 312 is correlated with image information (FIG. 3) and the signboard position, to the wireless communication unit 132 of the HMD 100 as selection information. The wireless communication unit 132 receives the selection information transmitted from the communication unit 330. The wireless communication unit 132 may acquire information regarding weather at the specified present position of the image display section 20 and the present time from a server different from the server 300. The wireless communication unit 132 corresponds to an information transmission/reception unit and a state detection unit in the appended claims.

The power supply 130 supplies power to the respective units of the HMD 100. For example, a secondary battery may be used as the power supply 130.

The storage unit 120 stores various computer programs. The storage unit 120 is constituted of a ROM, a RAM, or the like. The storage unit 120 includes a selection information storage portion 122 and a past history storage portion 124. The selection information storage portion 122 stores the selection information transmitted from the server 300 via the wireless communication unit 132. An image correlated with image information included in the selection information is displayed on the image display section 20 on the basis of the selection information stored in the selection information storage portion 122 or an image captured by the camera 61 which will be described later.

The past history storage portion 124 stores past stay information of the HMD 100. The stay information is generated as a result of the present position of the HMD 100 being specified by the GPS module 137 at a predetermined cycle. Specifically, in a case where the present position of the image display section 20 which is specified periodically is included within a predetermined range (for example, within 5 meters) from a position which is specified at a certain time point after a specific period has elapsed, it is determined that the user of the image display section 20 stayed at the specified position. For this reason, it is possible to determine a time period or the like in which the user of the image display section 20 stayed at a store located at the specified position on the basis of the stay information stored in the past history storage portion 124. The past history storage portion 124 corresponds to a personal information storage unit in the appended claims.

FIG. 5 is a list table illustrating an example of stay information VD of the user of the HMD 100. The stay information VD stores values of items such as a stay location and a stay frequency per month. The item of the stay location is divided into a stay ID as a temporary name of a stay location, and latitude and longitude of the stay location. The stay frequency per month includes information which is created on the basis of history for the recent one month from the previous day. The item of the stay frequency is divided into a total of stay times per month, the number of stays per month, an average stay time per stay, and a center average time point which is an average of centers of stay time points. For example, as illustrated in FIG. 5, the latitude of a location A as the stay ID is "130.x . . . xx1", and the longitude of the location A is "33.y . . . yy1". The user of the HMD 100 stays at the location for 240 minutes per month and stays there twice per month. For this reason, an average stay time per month is 120 minutes. The center average time point at which the user stays at the location A is 19:30. In the present embodiment, the location A, the location B, the location C, and the location D are respectively the stores such as "Fuji", "Karaoke JO", "OO drugstore", and "XX meat store" in FIG. 3, and may be different locations in other embodiments.

The CPU 140 (FIG. 4) reads and executes the computer programs stored in the storage unit 120 so as to function as an operating system 150 (OS 150), a display control unit 190, a sound processing unit 170, an image processing unit 160, an environmental information processing unit 169, a signboard detection unit 168, a past history collation unit 166, a distance measurement unit 161, and a display setting unit 165.

The display control unit 190 generates control signals for control of the right display driving unit 22 and the left display driving unit 24. Specifically, the display control unit 190 individually controls the right LCD control portion 211 to turn on and off the right LCD 241, controls the right backlight control portion 201 to turn on and off the right backlight 221, controls the left LCD control portion 212 to turn on and off the left LCD 242, and controls the left backlight control portion 202 to turn on and off the left backlight 222, by using the control signals. Consequently, the display control unit 190 controls each of the right display driving unit 22 and the left display driving unit 24 to generate and emit image light. For example, the display control unit 190 causes both of the right display driving unit 22 and the left display driving unit 24 to generate image light, causes either of the two units to generate image light, or causes neither of the two units to generate image light.

The display control unit 190 transmits the control signals for the right LCD control portion 211 and the left LCD control portion 212 thereto via the transmission units 51 and 52. The display control unit 190 transmits control signals for the right backlight control portion 201 and the left backlight control portion 202 thereto.

The image processing unit 160 acquires an image signal included in the content. The image processing unit 160 separates synchronization signals such as a vertical synchronization signal VSync and a horizontal synchronization signal HSync from the acquired image signal. The image processing unit 160 generates a clock signal PCLK by using a phase locked loop (PLL) circuit or the like (not illustrated) on the basis of a cycle of the separated vertical synchronization signal VSync or horizontal synchronization signal HSync. The image processing unit 160 converts an analog image signal from which the synchronization signals are separated into a digital image signal by using an A/D conversion circuit or the like (not illustrated). Next, the image processing unit 160 stores the converted digital image signal in a DRAM of the storage unit 120 for each frame as image data (RGB data) of a target image. The image processing unit 160 may perform, on the image data, image processes including a resolution conversion process, various color tone correction processes such as adjustment of luminance and color saturation, a keystone correction process, and the like, as necessary.

The image processing unit 160 transmits each of the generated clock signal PCLK, vertical synchronization signal VSync and horizontal synchronization signal HSync, and the image data stored in the DRAM of the storage unit 120, via the transmission units 51 and 52. Here, the image data which is transmitted via the transmission unit 51 is referred to as "right eye image data", and the image data which is transmitted via the transmission unit 52 is referred to as "left eye image data". The transmission units 51 and 52 function as a transceiver for serial transmission between the control section 10 and the image display section 20.

The sound processing unit 170 acquires an audio signal included in the content so as to amplify the acquired audio signal, and supplies the amplified audio signal to a speaker (not illustrated) of the right earphone 32 connected to the connection member 46 and a speaker (not illustrated) of the left earphone 34 connected thereto. In addition, for example, in a case where a Dolby (registered trademark) system is employed, the audio signal is processed, and thus different sounds of which frequencies are changed are respectively output from the right earphone 32 and the left earphone 34. Further, the sound processing unit 170 performs sound recognition on external sound acquired by the microphone 63. In a case where the external sound recognized through the sound recognition is predetermined sound which is set in advance, the sound processing unit 170 transmits a signal indicating that the acquired sound is the predetermined sound to the operation unit 135. The operation unit 135 allows various operations on the HMD 100 to be performed on the basis of the signal transmitted from the sound processing unit 170 in addition to a key operation of pushing the determination key 11 or the like.

The signboard detection unit 168 detects an image (hereinafter, also simply referred to as a "detected signboard") of a signboard correlated with the selection information stored in the selection information storage portion 122 from a captured image obtained by the camera 61 according to a pattern matching method or a statistical identification method. The signboard detection unit 168 specifies a direction of the camera 61 on the basis of a position of the image display section 20 specified by the GPS module 137 and a position of the detected signboard in the captured image. In other words, the signboard detection unit 168 can specify a direction of the image display section 20 in which the camera 61 is disposed. If a signboard image correlated with at least one piece of selection information is detected from the captured image, the signboard detection unit 168 transmits the store-based advertisement data SD of a store correlated with the detected signboard to the display setting unit 165 and the environmental information processing unit 169. The signboard detection unit 168, the camera 61, and the GPS module 137 correspond to an image detection portion in the appended claims, and the detected signboard image corresponds to an identification target image in the appended claims.

The environmental information processing unit 169 collates an external temperature of the HMD 100 measured by the thermometer 65 with an environmental limitation in the store-based advertisement data SD transmitted from the signboard detection unit 168. The environmental information processing unit 169 transmits a result of collation between the external temperature of the HMD 100 measured by the thermometer 65 and the environmental limitation in the store-based advertisement data SD to the display setting unit 165.

The distance measurement unit 161 measures a distance between the image display section 20 and the detected signboard position on the basis of the present position of the image display section 20 specified by the GPS module 137 and the signboard position which is stored in the selection information storage portion 122 and is correlated with the detected signboard.

The past history collation unit 166 collates the store-based advertisement data SD correlated with the detected signboard with the stay information VD of the user of the HMD 100 stored in the past history storage portion 124. The past history collation unit 166 transmits a result of the collation between the store-based advertisement data SD of the detected signboard and the stay information VD to the display setting unit 165.

The display setting unit 165 sets a display aspect of an image to be displayed on the image display section 20 on the basis of the store-based advertisement data SD correlated with the detected signboard, transmitted from the signboard detection unit 168, and the collation result transmitted from the environmental information processing unit 169, and displays the image on the image display section 20. A specific aspect of an image displayed on the image display section 20 will be described later in "A-2. Advertisement Display Process". The environmental information processing unit 169, the display setting unit 165, and the signboard detection unit 168 correspond to a display image control unit in the appended claims.

The operation unit 135 performs various operations on the image display section 20 on the basis of the determination key 11, the display changing key 13, the track pad 14, the luminance changing key 15, the direction key 16, and the menu key 17, and the power switch 18, which receive physical operations from the user, and a signal transmitted through sound recognition in the sound processing unit 170.

The interface 180 is an interface which connects the control section 10 to various external apparatuses OA which are content supply sources. As the external apparatuses OA, for example, a personal computer (PC), a portable telephone terminal, and a gaming terminal may be used. As the interface 180, for example, a USB interface, a microUSB interface, and a memory card interface may be used.

The image display section 20 includes the right display driving unit 22, the left display driving unit 24, the right light guide plate 261 as the right optical image display unit 26, the left light guide plate 262 as the left optical image display unit 28, the camera 61, the microphone 63, and the thermometer 65.

The right display driving unit 22 includes a reception portion 53 (Rx 53), the right backlight control portion 201 (right BL control portion 201), the right backlight 221 (right BL 221), the right LCD control portion 211 and the right LCD 241, and a right projection optical system 251. The right backlight control portion 201 and the right backlight 221 function as a light source. The right LCD control portion 211 and the right LCD 241 function as a display element.

The reception portion 53 functions as a receiver for serial transmission between the control section 10 and the image display section 20. The right backlight control portion 201 drives the right backlight 221 on the basis of an input control signal. The right backlight 221 is a light emitting body such as an LED or an electroluminescent element (EL). The right LCD control portion 211 drives the right LCD 241 on the basis of the clock signal PCLK, the vertical synchronization signal VSync, the horizontal synchronization signal HSync, and the right eye image data which are input via the reception portion 53. The right LCD 241 is a transmissive liquid crystal panel in which a plurality of pixels are disposed in a matrix.

The right projection optical system 251 is constituted of a collimator lens which converts image light emitted from the right LCD 241 into parallel beams of light flux. The right light guide plate 261 as the right optical image display unit 26 reflects image light output from the right projection optical system 251 along a predetermined light path, so as to guide the image light to the right eye RE of the user.

The left display driving unit 24 has the same configuration as that of the right display driving unit 22. The left display driving unit 24 includes a reception portion 54 (Rx 54), the left backlight control portion 202 (left BL control portion 202), the left backlight 222 (left BL 222), the left LCD control portion 212 and the left LCD 242, and a left projection optical system 252. The left backlight control portion 202 and the left backlight 222 function as a light source. The left LCD control portion 212 and the left LCD 242 function as a display element. In addition, the left backlight control portion 202, the left LCD control portion 212, the left backlight 222, and the left LCD 242 are collectively referred to as an "image light generation unit". The left projection optical system 252 is constituted of a collimator lens which converts image light emitted from the left LCD 242 into parallel beams of light flux. The left light guide plate 262 as the left optical image display unit 28 reflects image light output from the left projection optical system 252 along a predetermined light path, so as to guide the image light to the left eye LE of the user. Furthermore, the left projection optical system 252 and the left light guide plate 262 are collectively referred to as a "light guide portion".

Figure 6:
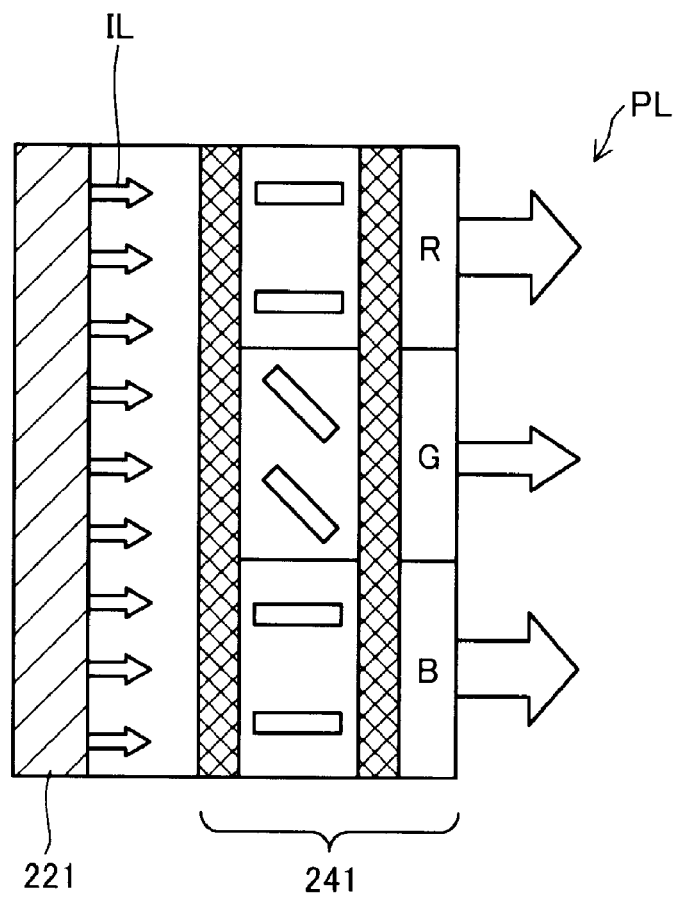
FIG. 6 is a diagram illustrating a state in which image light is emitted by an image light generation unit.

FIG. 6 is a diagram illustrating a state in which image light is emitted by the image light generation unit. The right LCD 241 drives liquid crystal at respective pixel positions disposed in a matrix so as to change a transmittance of light transmitted through the right LCD 241, thereby modulating illumination light IL applied from the right backlight 221 into effective image light PL representing an image. This is also the same for the left side. As illustrated in FIG. 6, the backlight type is employed in the present embodiment, but there may be a configuration in which image light is emitted using a front light type or a reflective type.

A-2. Information Detection Process

Figure 7:
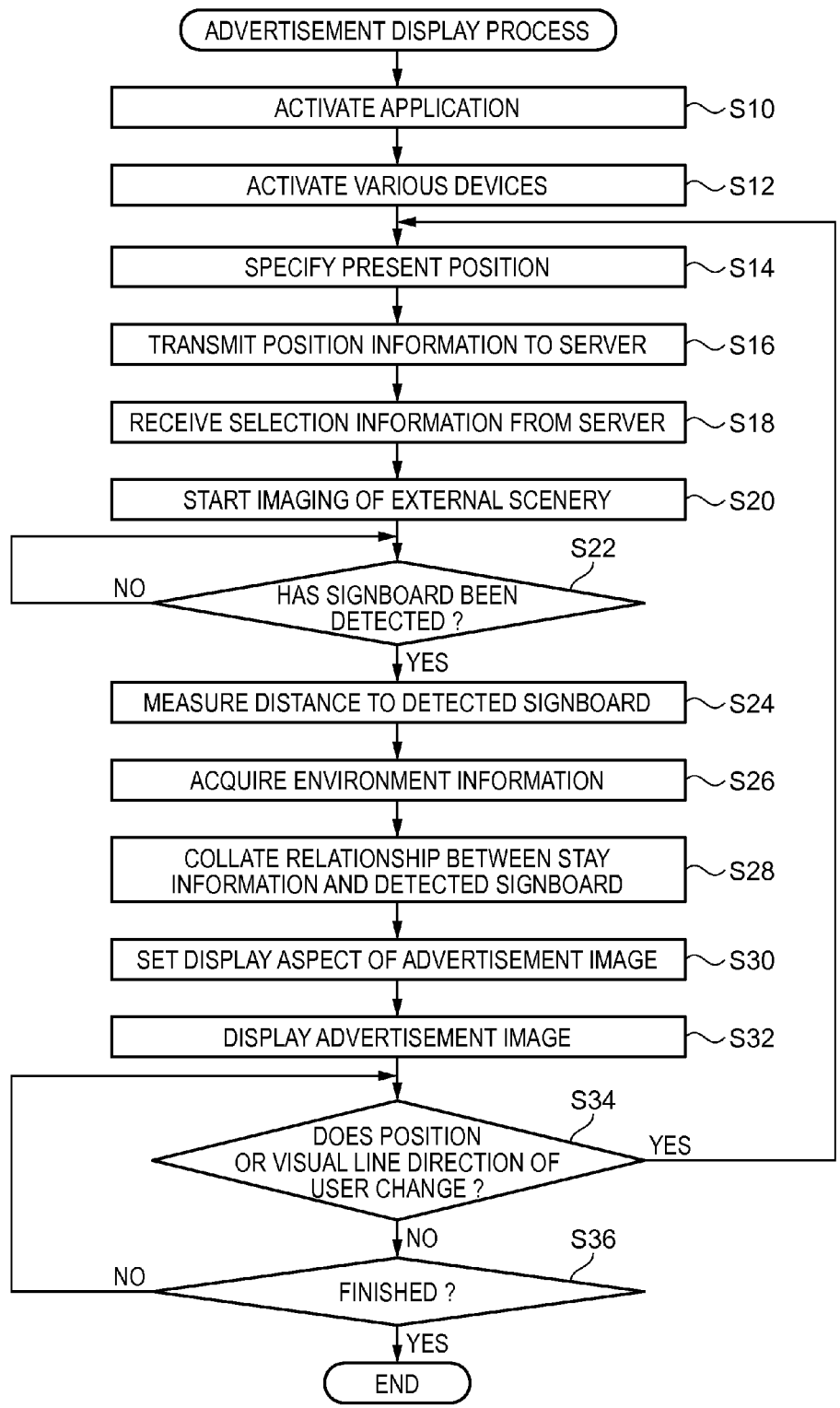
FIG. 7 is a flowchart illustrating an advertisement display process.

FIG. 7 is a flowchart illustrating an advertisement display process. The advertisement display process is performed by the control section 10 performing various processes. In the advertisement display process, advertisement information correlated with a detected signboard is displayed on the image display section 20 as an image in a display aspect which is set on the basis of an external temperature or the like of the HMD 100.

In the advertisement display process, first, if the operation unit 135 receives a predetermined operation, an application of the advertisement display process is activated (step S10). If the application of the advertisement display process is activated, the control section 10 activates various devices such as the camera 61 which is required to perform the advertisement display process (step S12). Next, the activated GPS module 137 specifies the present position of the image display section 20 (step S14). If the present position of the image display section 20 is specified, the wireless communication unit 132 transmits position information of the image display section 20 to the communication unit 330 of the server 300 (step S16). Next, the wireless communication unit 132 receives selection information which is selected by the server 300 on the basis of the transmitted position information of the image display section 20 (step S18).

If the wireless communication unit 132 receives the selection information, the camera 61 starts capturing an image of external scenery (step S20). Next, the signboard detection unit 168 monitors whether or not the same image as a signboard image included in the selection information received by the wireless communication unit 132 is detected from the image captured by the camera 61 (step S22). In other words, the signboard detection unit 168 determines whether or not a detected signboard is included in the captured image. If the detected signboard is not included in the captured image (NO in step S22), the signboard detection unit 168 continues to monitor whether or not the detected signboard is included in the captured image (step S22). If the detected signboard is included in the captured image (YES in step S22), the distance measurement unit 161 measures a distance between the image display section 20 and a position of the detected signboard on the basis of the present position of the image display section 20 specified by the GPS module 137 and the signboard position stored in the selection information storage portion 122 (step S24).

Figure 8:
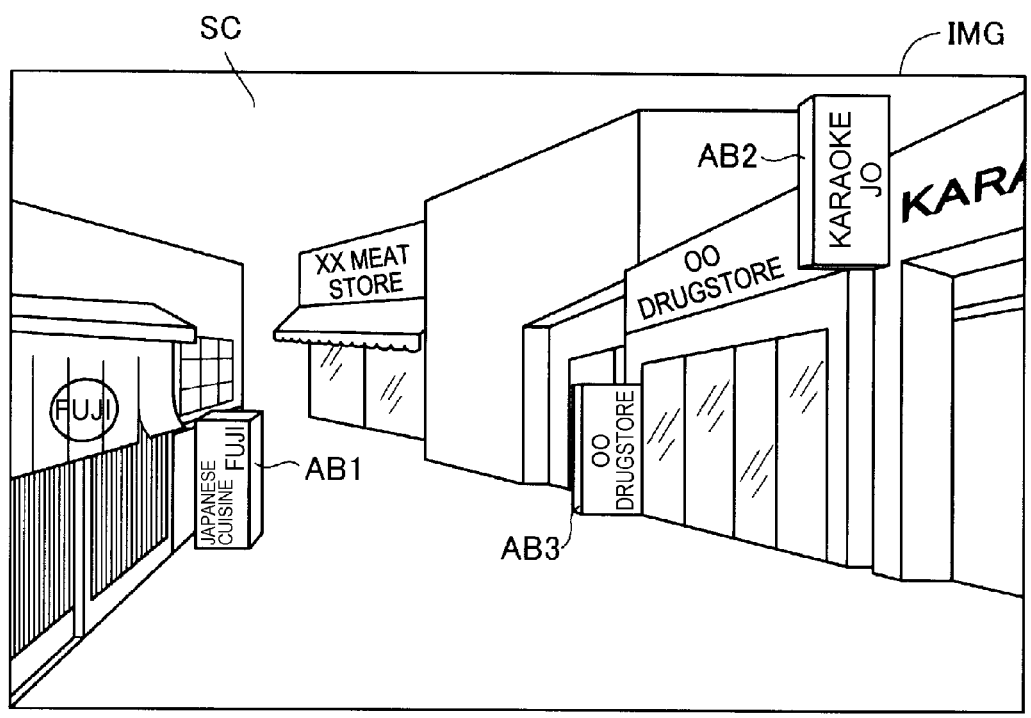
FIG. 8 is a diagram illustrating an example of an image captured by a camera.

FIG. 8 is a diagram illustrating an example of a captured image IMG obtained by the camera 61. The captured image IMG illustrated in FIG. 8 is an image of external scenery SC captured by the camera 61 which is disposed on the HMD 100 worn by the user. From the captured image IMG, the signboard detection unit 168 detects three signboards including a signboard AB1, a signboard AB2, and a signboard AB3 as the same signboards as signboard images included in the store-based advertisement data SD of the selection information stored in the selection information storage portion 122. As illustrated in FIG. 8, the signboard AB1 of "Fuji" is installed in front of an entrance of store having the name "Fuji", the signboard AB2 of "Karaoke JO" is installed on an upper side of an entrance of the store having the name "Karaoke JO", and the signboard AB3 of "OO drugstore" is installed in front of an entrance of the store having the name "OO drugstore". The signboard of "XX meat store" is present near the present position of the image display section 20 but is not shown in the imaging range. The distance measurement unit 161 measures respective distances between the present position of the image display section 20 and the positions of the signboards AB1, AB2 and AB3 detected by the signboard detection unit 168.

If the respective distances between the present position of the image display section 20 and the positions of the detected signboards are measured, the wireless communication unit 132, the thermometer 65, and the environmental information processing unit 169 acquire environmental information (step S16 of FIG. 7). The environmental information includes information regarding weather at the present position of the image display section 20 acquired by the wireless communication unit 132, the time, and an external temperature of the image display section 20 measured by the thermometer 65 and the environmental information processing unit 169. Next, the past history collation unit 166 collates the stay information VD of the user of the HMD 100 stored in the past history storage portion 124 with relationships of the signboards AB1, AB2 and AB3 which are the detected signboards with the respective stores (step S28).

Next, the display setting unit 165 sets a display aspect for displaying an advertisement image included in the store-based advertisement data SD on the image display section 20 on the basis of the signboards AB1, AB2 and AB3 which are the detected signboards, the store-based advertisement data SD of the signboards AB1, AB2 and AB3, the respective positions of the signboards AB1, AB2 and AB3, the distances to the image display section 20, the environmental information, and the stay information VD of the user (step S28). As an example of the set display aspect, there is an aspect in which the display setting unit 165 increases fonts of a text image correlated with a detected signboard close to the image display section 20, displays advertisement of a store in which the present time is close to the center average time point in the stay information VD at a central part of a range in which the image light generation unit can generate image light, or causes an advertisement of a store in which the stay time in the stay information VD is long to blink. If the display aspect is set, the display setting unit 165 and the image processing unit 160 cause the image light generation unit to generate image light and thus an advertisement image is displayed on the basis of the set display aspect (step S32).

Figure 9:
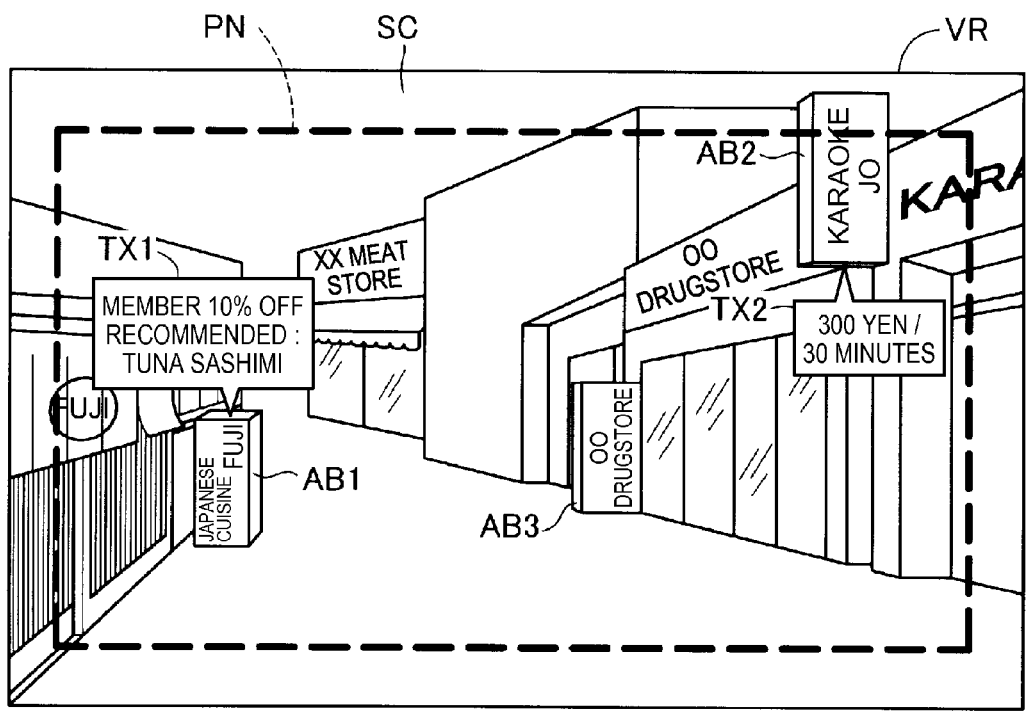
FIG. 9 is a diagram illustrating an example of a visual field which is visually recognized by the user in a case where advertisement images of detected signboards are displayed.

FIG. 9 is a diagram illustrating an example of a visual field VR which is visually recognized by the user in a case where advertisement images TX1 and TX2 of the detected signboards are displayed. FIG. 9 illustrates a state in which the advertisement image TX1 correlated with "Fuji" and the advertisement image TX2 correlated with "Karaoke JO" are visually recognized by the user of the HMD 100 in an image display maximum region PN which is the maximum region in which the image light generation unit can generate image light. The advertisement image TX1 is a text image indicating today's membership discount and a recommended menu of "Fuji". The advertisement image TX2 is a text image indicating that a rate per 30 minutes of "Karaoke JO" is 300 yen. The advertisement images TX1 and TX2 are text images which are respectively correlated with the signboards AB1 and AB2, and are respectively displayed near the positions of the signboards AB1 and AB2 which are the detected signboards. Respective distances from the present position of the image display section 20 to the position of the signboard AB2 and the position of the signboard AB3 are almost the same as each other. On the other hand, the weather and the present time acquired by the wireless communication unit 132 are "fine" and "17 o'clock". The external temperature acquired by the environmental information processing unit 169 and the thermometer 65 is 31° C. As illustrated in FIG. 3, Celsius 30 degrees is set as an environmental limitation of "Fuji" in the store-based advertisement data SD, and thus the advertisement image TX1 of "Fuji" corresponding to a case where an external temperature is 30° C. or higher is displayed in the image display maximum region PN (FIG. 9). Since the present time is 17:00, this is associated with time limitations of both "Fuji" and "Karaoke JO" in the store-based advertisement data SD. However, the center average time point of "OO drugstore" in the stay information VD (FIG. 5) is 8:00, which was nine hours ago from the present time. In the present embodiment, in a case where the center average time point is blank for five hours or more from the present time, the display setting unit 165 does not display a corresponding advertisement image in the image display maximum region PN. Numerical values of the stay time and the number of stays per month of the user in "Fuji" of the stay information VD are greater than numerical values of the stay time and the number of stays in "Karaoke JO". For this reason, the display setting unit 165 sets a font of the advertisement image TX1 correlated with the signboard AB1 of "Fuji" to be thicker and larger than a font of the advertisement image TX2 correlated with "Karaoke JO". Since the number of pages in "Fuji" of the store-based advertisement data SD (FIG. 3) is set to "2", if the operation unit 135 receives a predetermined operation, the display setting unit 165 changes a text image displayed in the advertisement image TX1 within the image display maximum region PN. The advertisement images TX1 and TX2 correspond to images as determination information correspondence information in the appended claims.

If the advertisement images TX1 and TX2 are displayed in the image display maximum region PN (step S32 of FIG. 7), the GPS module 137 detects a change in the present position of the image display section 20, and the signboard detection unit 168 detects a change in the visual line direction of the user of the HMD 100 based on a change in an image captured by the camera 61 (step S34). If a change is detected in at least one of the present position of the image display section 20 and the visual line direction of the user (YES in step S34), the control section 10 repeatedly performs the processes in step S14 and the subsequent steps.

Figure 10:
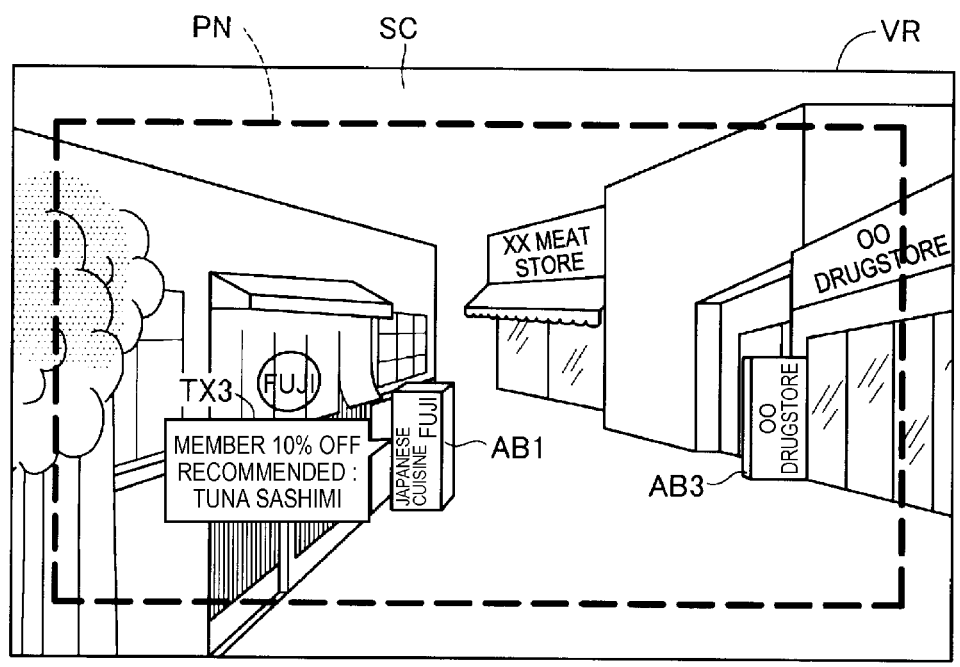
FIG. 10 is a diagram illustrating an example of a visual field which is visually recognized by the user after a visual line direction of the user of the HMD changes.

FIG. 10 is a diagram illustrating an example of the visual field VR which is visually recognized by the user after the visual line direction of the user of the HMD 100 changes. FIG. 10 illustrates a state in which the visual line direction of the user is directed further to the left side than in the state illustrated in FIG. 9. The present position of the image display section 20 does not change from the state illustrated in FIG. 9. As illustrated in FIG. 10, since the signboard AB2 of "Karaoke JO" is not a detected signboard any longer, the display setting unit 165 sets the advertisement image TX2 correlated with the signboard AB2 not to be displayed. In the present embodiment, since an advertisement image is set in advance not to be displayed in the central part of the image display maximum region PN, the display setting unit 165 changes a display position in the image display maximum region PN from the advertisement image TX1 (FIG. 9) to an advertisement image TX3 of "Fuji" correlated with the signboard AB1. Unlike in the state illustrated in FIG. 9, the state illustrated in FIG. 10 has no changes in the time and weather. The advertisement image TX3 corresponds to an image as determination information correspondence information in the appended claims.

In the process in step S34 of FIG. 7, if it is determined that there is no change in the present position of the image display section 20 and there is no change in the visual line direction of the user (NO in step S34), the control section 10 determines whether or not the advertisement display process is finished (step S36). In the present embodiment, if the operation unit 135 receives a predetermined operation for finishing the advertisement display process, the control section 10 finishes the advertisement display process. If the operation unit 135 does not receive a predetermined operation for finishing the advertisement display process (NO in step S36), the control section 10 repeatedly performs the processes in step S34 and the subsequent steps. In the process in step S36, if the operation unit 135 receives a predetermined operation for finishing the advertisement display process (YES in step S36), the control section 10 finishes the advertisement display process.

As described above, in the HMD 100 of the present embodiment, the GPS module 137 specifies the present position of the HMD 100, and the wireless communication unit 132 transmits the specified position information of the HMD 100 to the server 300 and receives selection information transmitted from the server 300. The signboard detection unit 168 and the GPS module 137 specify a direction of the image display section 20, and the display setting unit 165 displays the advertisement images TX1 and TX2 correlated with the signboards AB1 and AB2 which are the detected signboards on the image display section 20. For this reason, in the HMD 100 of the present embodiment, since the user of the HMD 100 can visually recognize the advertisement images TX1 and TX2 correlated with the detected signboards in addition to the real object signboards AB1 and AB2 within the visually recognizable range and can thus acquire a larger amount of information a user's convenience is improved. Since the user can visually recognize the advertisement images TX1 and TX2 correlated with the signboards AB1 and AB2 which are present in the visual line direction of the user, but may not visually recognize information correlated with a signboard which is present in a direction deviated relative to the visual line direction even if the signboard is close to the user, the user can visually recognize only necessary information.

In the HMD 100 of the present embodiment, the signboard detection unit 168 detects the signboards AB1 and AB2 from an image captured by the camera 61, and the display setting unit 165 displays the advertisement images TX1 and TX2 correlated with the signboards AB1 and AB2 which are the detected signboards on the image display section 20. For this reason, in the HMD 100 of the present embodiment, an advertisement image correlated with a signboard which is present in the visual line direction of the user but is not visually recognized by the user is not displayed on the image display section 20, and thus the user does not visually recognize the unnecessary advertisement image. Therefore, a user's convenience is further improved.

In the HMD 100 of the present embodiment, the GPS module 137 acquires the present time and information regarding weather at the present position of the image display section 20 from another server as environmental information, the thermometer 65 and the environmental information processing unit 169 acquire an external temperature of the image display section 20, and the display setting unit 165 sets the advertisement images TX1 and TX2 to be displayed on the image display section 20 according to the acquired environmental information. For this reason, in the HMD 100 of the present embodiment, since the images based on the external information of the image display section 20 in addition to the present position of the image display section 20 and the direction of the image display section 20 are displayed in the image display maximum region PN, the user can visually recognize information suitable for a situation in a corresponding location, and thus a user's convenience is further improved.

In the HMD 100 of the present embodiment, the past history storage portion 124 of the storage unit 120 stores the stay information VD of the user in the past, and the display setting unit 165 displays the advertisement images TX1 and TX2 in the image display maximum region PN on the basis of the stay information VD and the store-based advertisement data SD correlated with the signboards AB1 and AB2 detected from the captured image IMG. For this reason, in the HMD 100 of the present embodiment, since the advertisement images based on the stay information VD of the user in addition to the present position of the image display section 20 and the direction of the image display section 20 are displayed on the image display section 20, the user can visually recognize information suitable for a user's preferences, and thus a user's convenience is further improved.

In the HMD 100 of the present embodiment, the distance measurement unit 161 and the GPS module 137 measure the present position of the image display section 20 and distances to positions of detected signboards, and the display setting unit 165 sets sizes of fonts of text images of the advertisement images TX1 and TX2 correlated with the signboards AB1 and AB2 which are the detected signboards on the basis of the measured distances. For this reason, in the HMD 100 of the present embodiment, since a text image included in advertisement information correlated with a signboard which is present closer to the image display section 20 is displayed to become larger on the image display section 20, the user can recognize a distance to the positions of the detected signboards on the basis of the advertisement images TX1 and TX2 displayed on the image display section 20, and thus a user's convenience is further improved.

B. Second Embodiment

B-1. Configuration of HMD

Figure 11:
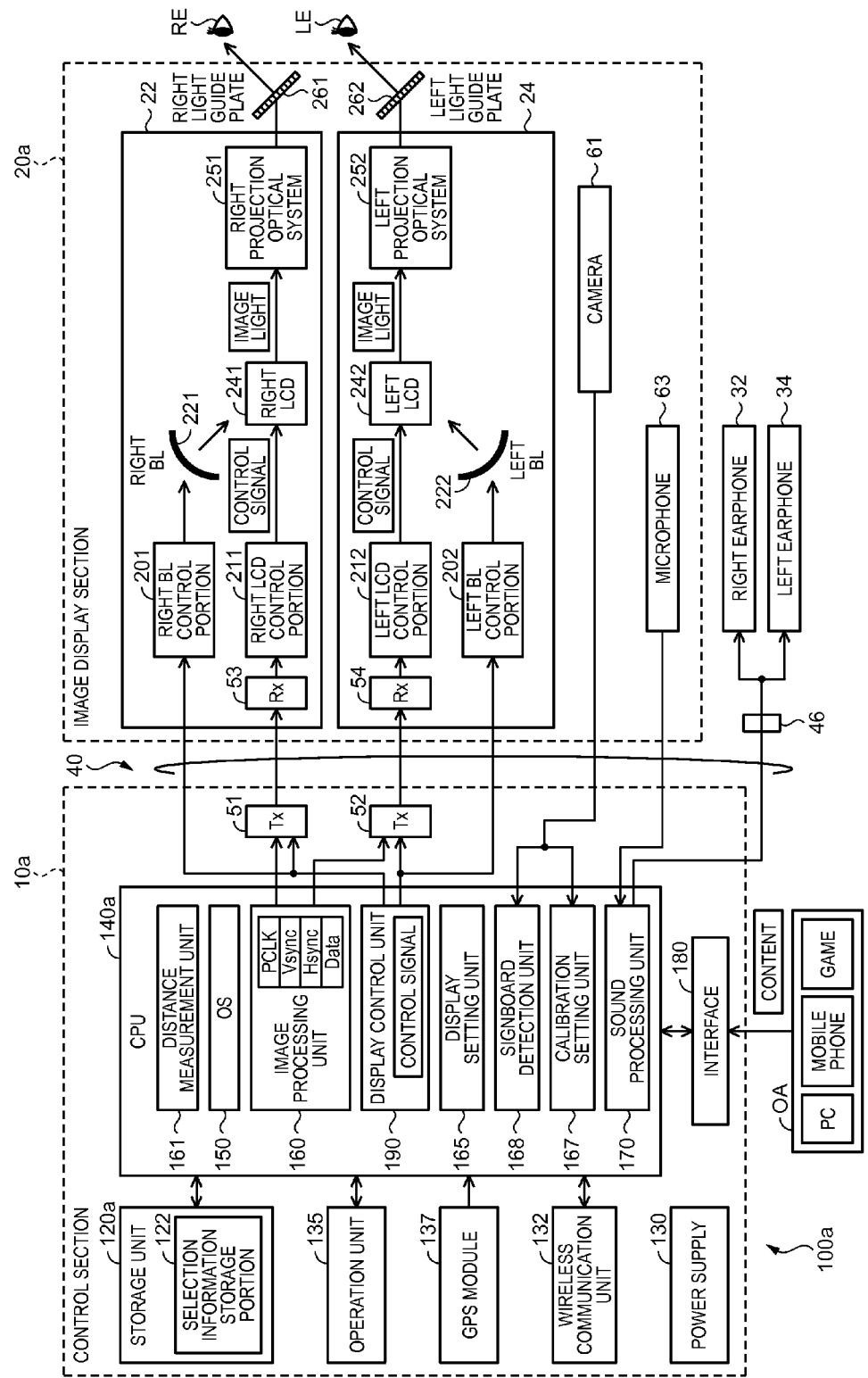
FIG. 11 is a functional block diagram illustrating a configuration of an HMD of a second embodiment.

FIG. 11 is a functional block diagram illustrating a configuration of a HMD 100a of a second embodiment. The HMD 100a of the second embodiment is different from the HMD 100 of the first embodiment in that a storage unit 120a of a control section 10a does not include the past history storage portion 124, a CPU 140a of the control section 10a functions as a calibration setting unit 167 instead of the past history collation unit 166 and the environmental information processing unit 169, and an image display section 20a does not include the thermometer 65, and the remaining configurations are the same as those of the HMD 100 of the first embodiment.

The calibration setting unit 167 defines a relative positional relationship between the index finger of the user of the HMD 100a as a specific target object detected within an image captured by the camera 61 and an advertisement image displayed in the image display maximum region PN of the image display section 20a. A specific defining method will be described in "B-2. Advertisement Display Process". The calibration setting unit 167 corresponds to a correction unit in the appended claims.

B-2. Advertisement Display Process

Figure 12:
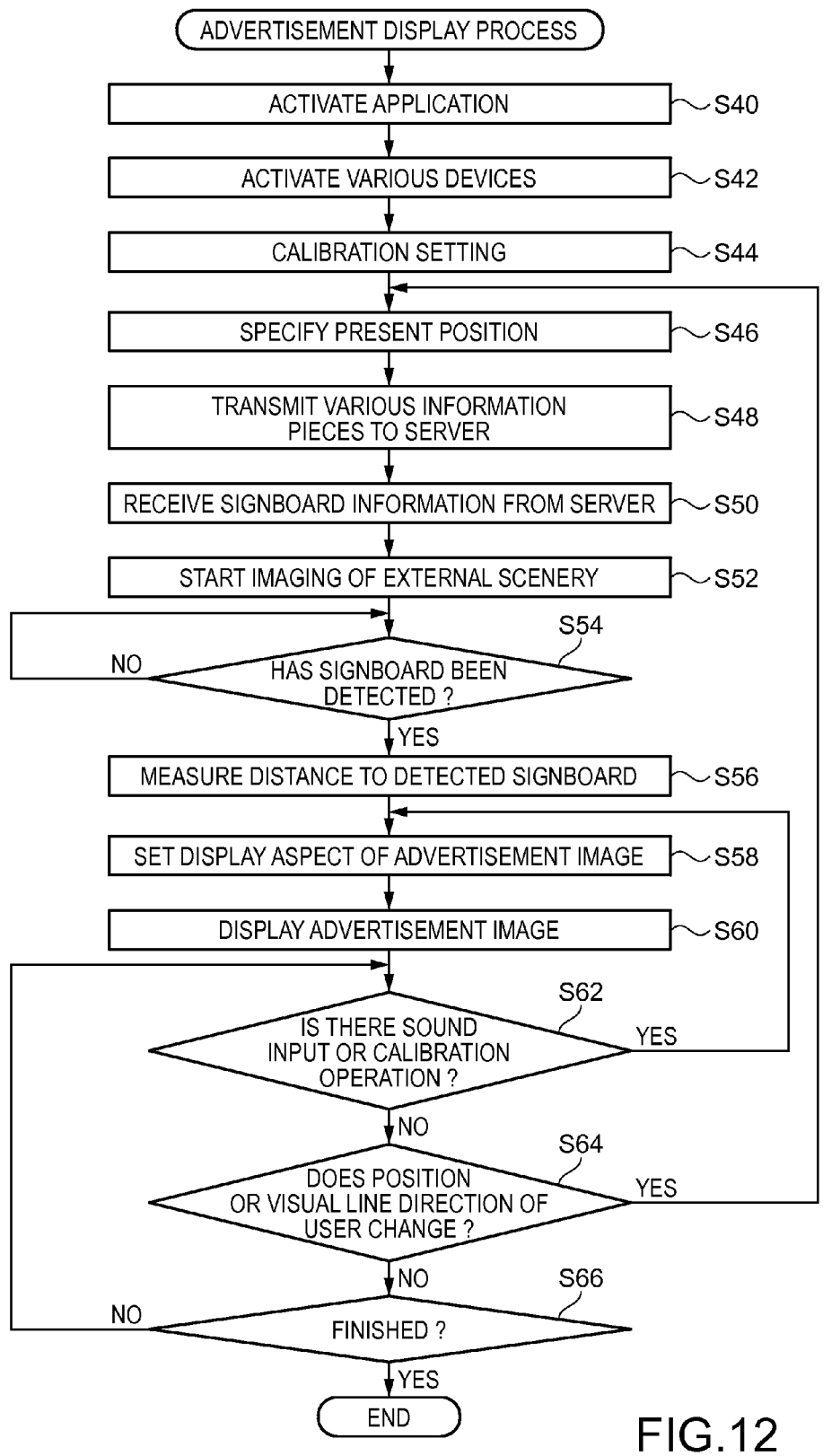
FIG. 12 is a flowchart illustrating an advertisement display process according to the second embodiment.

FIG. 12 is a flowchart illustrating an advertisement display process of the second embodiment. The advertisement display process of the second embodiment is different from the advertisement display process (FIG. 7) of the first embodiment in that processes in steps S44 and S62 are added thereto, and the processes in steps S26 and S28 of FIG. 7 are deleted, and the remaining processes are the same as those in the advertisement display process of the first embodiment. For this reason, in the second embodiment, detailed description of the same processes as those in the advertisement display process of the first embodiment will be omitted.

In the advertisement display process of the second embodiment, if an application of the advertisement display process is activated (step S40 of FIG. 12), the CPU 140a activates various devices (step S42), and then the calibration setting unit 167 of the CPU 140a performs calibration setting (step S44). First, in the calibration setting, the display setting unit 165 displays a setting image which is an image for performing the calibration setting in the image display maximum region PN of the image display section 20a. Then, the camera 61 starts capturing an image. The calibration setting unit 167 performs the calibration setting on the basis of a relationship between a change in a position of the index finger of the user which is set in advance as a specific target object detected in an image captured by the camera 61, and the setting image displayed in the image display maximum region PN.

Figure 13:
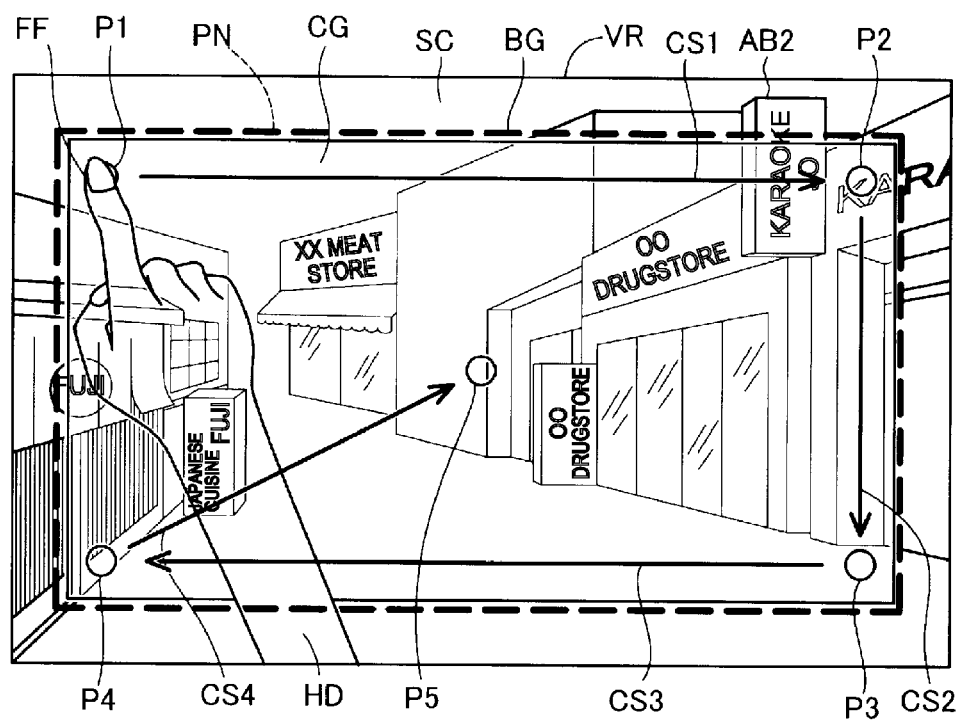
FIG. 13 is a diagram illustrating an example of a visual field which is visually recognized by the user in a case where calibration setting is being performed.

FIG. 13 is a diagram illustrating an example of a visual field VR which is visually recognized by the user in a case where the calibration setting is performed. FIG. 13 illustrates a state in which a setting image CG for performing the calibration setting is displayed so as to overlap the external scenery SC and the right hand HD of the user is shown in an image captured by the camera 61. The setting image CG includes a rectangular image BG, five circular images P1, P2, P3, P4 and P5, and four arrow images CS1, CS2, CS3 and CS4. The circular image P1 is formed on the upper left part in the vicinity of one vertex of the rectangular image BG; the circular image P2 is formed in the vicinity of the upper right vertex of the rectangular image BG; the circular image P3 is formed in the vicinity of the lower right vertex of the rectangular image BG; the circular image P4 is formed in the vicinity of the lower left vertex of the rectangular image BG; and the circular image P5 is formed at the center of the rectangular image BG. The arrow image CS1 is an arrow which linearly connects the circular image P1 to the circular image P2; the arrow image CS2 is an arrow which linearly connects the circular image P2 to the circular image P3; the arrow image CS3 is an arrow which linearly connects the circular image P3 to the circular image P4; and the arrow image CS4 is an arrow which linearly connects the circular image P4 to the circular image P5.

After the setting image CG is displayed in the image display maximum region PN, the calibration setting unit 167 detects the index finger FF of the right hand HD in the captured image. Then, the calibration setting unit 167 defines a positional relationship between the setting image CG and the index finger FF included in the external scenery SC by detecting that the index finger FF was moved to sequentially overlap the circular image P1, the circular image P2, the circular image P3, the circular image P4, and the circular image P5 along the arrow image CS1, the arrow image CS2, the arrow image CS3, and the arrow image CS4 with the circular image P1 as a starting point. Consequently, the calibration setting unit 167 sets the index finger FF imaged by the camera 61 to a pixel at a certain position in the image display maximum region PN. The setting image CG corresponds to a specific image in the appended claims, and the index finger FF of the right hand HD corresponds to a specific target object in the appended claims.

If the calibration setting is performed (step S44 of FIG. 12), the control section 10a performs processes in steps S46 to S56. Then, the display setting unit 165 sets display aspects of advertisement images which will be displayed on the image display section 20a on the basis of detected signboards, the store-based advertisement data SD of each of the detected signboards, positions of the detected signboards, and distances to the present position of the image display section 20a (step S58). Next, the display setting unit 165 and the image processing unit 160 display advertisement images on the image display section 20a on the basis of the set display aspects (step S58).

Figure 14:
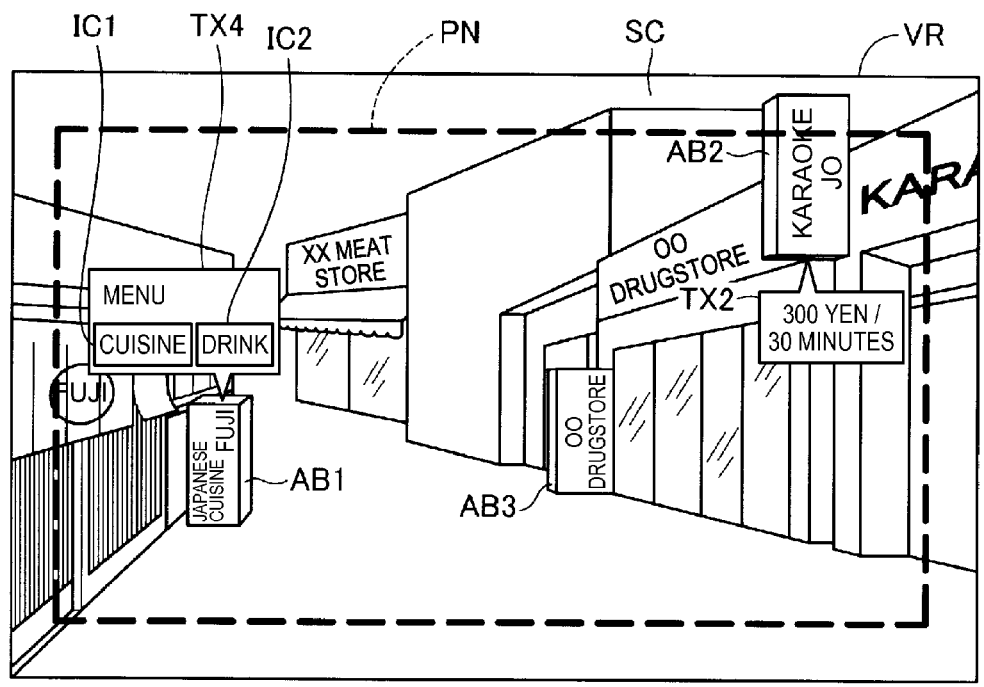
FIG. 14 is a diagram illustrating an example of a visual field which is visually recognized by the user in a case where advertisement images of detected signboards are displayed.

FIG. 14 is a diagram illustrating an example of a visual field VR which is visually recognized by the user in a case where advertisement images TX2 and TX4 of the detected signboards are displayed. As illustrated in FIG. 14, in the second embodiment, the display setting unit 165 displays the advertisement image TX4 correlated with the signboard AB1 which is the detected signboard in the image display maximum region PN. The advertisement image TX4 includes two selectable icon images IC1 and IC2. After the calibration setting is performed, a calibration operation in which the user overlaps the index finger FF on the icon image IC1 or the icon image IC2 is performed, and thus the operation unit 135 can select the overlapping icon image and can display an advertisement image which is different from the advertisement image TX4 correlated with the selected icon image in the image display maximum region PN.

If the advertisement image is displayed in the image display maximum region PN (step S60 of FIG. 12), the operation unit 135 determines whether or not sound input or a calibration operation using the index finger FF has been received (step S62). In other embodiments, it may be determined whether or not a key operation of the determination key 11 or the like of the operation unit 135 has been received. In the process in step S62, if the operation unit 135 has received the sound input or the calibration operation (YES in step S62), the display setting unit 165 sets a display aspect of an advertisement image which will be displayed in the image display maximum region PN on the basis of the received sound input or calibration operation (step S58), and the display setting unit 165 and the image processing unit 160 display the set advertisement image in the image display maximum region PN (step S60).

Figure 15:
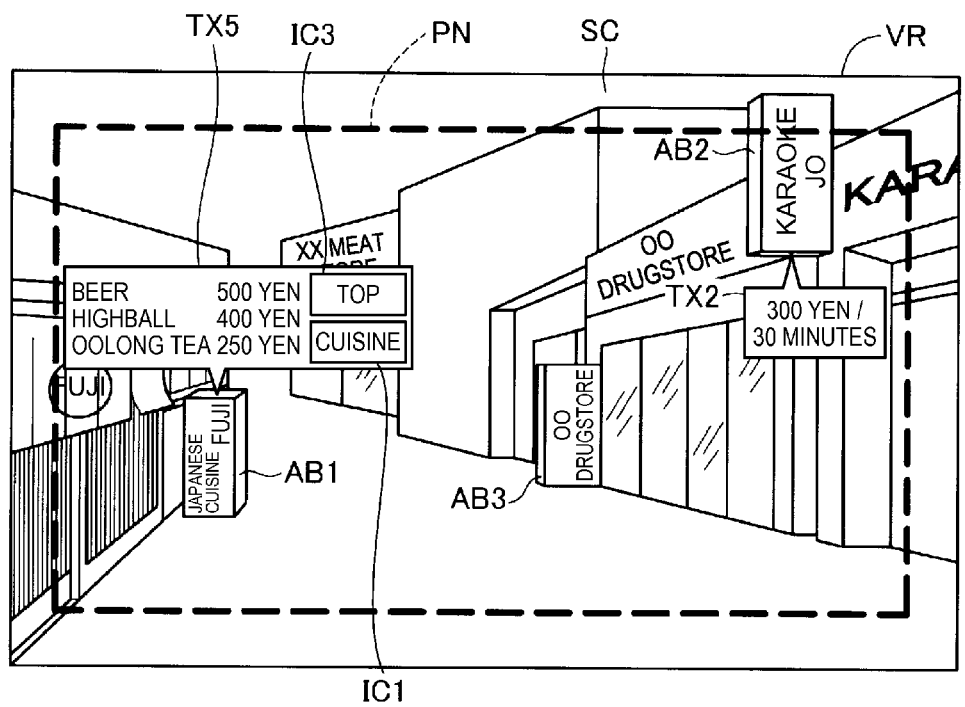
FIG. 15 is a diagram illustrating an example of a visual field which is visually recognized by the user after a calibration operation is performed.

FIG. 15 is a diagram illustrating an example of a visual field VR which is visually recognized by the user after the calibration operation is performed. FIG. 15 illustrates an advertisement image TX5 which is displayed in a case where the icon image IC2 in the advertisement image TX4 illustrated in FIG. 14 is selected through the calibration operation. The advertisement image TX5 shows a part of a drink menu provided by "Fuji" correlated with the selected icon image IC2 (FIG. 14) as a text image, and also includes two icon images IC1 and IC3. If the icon image IC3 is selected through sound input or a calibration operation, the display setting unit 165 displays the advertisement image TX4 instead of the advertisement image TX5 in the image display maximum region PN. If the icon image IC1 is selected, the display setting unit 165 displays a part of a cuisine menu provided by "Fuji" correlated with the icon image IC1 in the image display maximum region PN instead of the advertisement image TX5. The advertisement images TX4 and TX5 correspond to images as determination information correspondence information in the appended claims.

If the advertisement images TX2 and TX5 are displayed in the image display maximum region PN (step S60 of FIG. 12), the operation unit 135 determines whether or not sound input or a calibration operation using the index finger FF has been received (step S62). If the operation unit 135 has received neither of the sound input and the calibration operation (NO in step S62), the control section 10a performs processes in step S64 and the subsequent steps.

As described above, in the HMD 100a of the second embodiment, the calibration setting unit 167 performs the calibration setting on the basis of a positional relationship between the rectangular image BG displayed on the image display section 20a and the index finger FF of the right hand HD of the user detected in a captured image. After the calibration setting is performed, the display setting unit 165 changes an image displayed on the image display section 20a from the advertisement image TX4 to the advertisement image TX5 on the basis of a position of the index finger FF detected in the captured image. For this reason, in the HMD 100a of the second embodiment, since the external scenery SC of the real world overlaps an image displayed on the image display section 20a, the user can recognize that the external scenery SC is the same as the displayed image so as to perform an operation, and thus a user's convenience is improved.

C. Third Embodiment

C-1. Configuration of HMD

Figure 16:
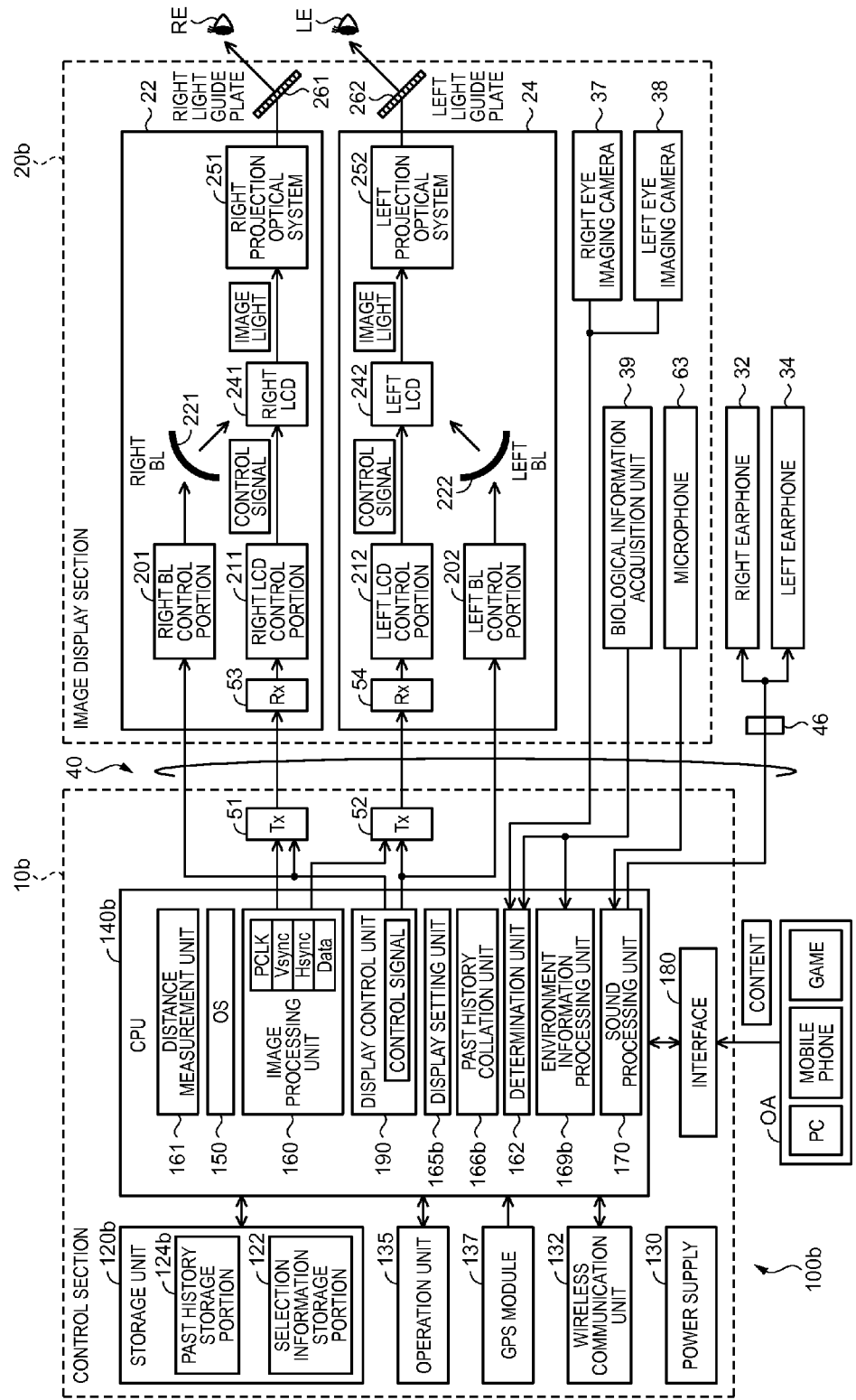
FIG. 16 is a functional block diagram illustrating a configuration of an HMD of a third embodiment.

FIG. 16 is a functional block diagram illustrating a configuration of a HMD 100b of a third embodiment. In the first and second embodiments, an advertisement image is displayed in the image display maximum region PN in a case where a detected signboard is included in a captured image, but, in the third embodiment, an advertisement image is displayed in the image display maximum region PN on the basis of the specified present position of the user and determination information for determining whether or not an image is displayed. For this reason, in the third embodiment, configurations which are different from those of the first and second embodiments will be described, and description of identical configurations will be omitted. In the third embodiment, past history of the user is used as the determination information.

As illustrated in FIG. 16, an image display section 20b includes a right eye imaging camera 37 which images the right eye of the user who wears the image display section 20b on the head, a left eye imaging camera 38 which images the left eye of the user, and a biological information acquisition unit 39 which acquires biological information of the user. In the third embodiment, each of the right eye imaging camera 37 and the left eye imaging camera 38 is a monocular camera but may be a stereo camera. Hereinafter, the right eye imaging camera 37 and the left eye imaging camera 38 are collectively simply referred to as "eye imaging cameras 37 and 38". Images of the eyes captured by the eye imaging cameras 37 and 38 are used to specify a visual line direction of the user and to measure a size of the pupil of the user as will be described later. The biological information acquisition unit 39 is a sensor which acquires at least one piece of biological information of the user, such as temperature, blood pressure, heart rate, respiration, and an electroencephalograph of the user. Details of the biological information acquisition unit 39 and an environmental information processing unit 169b of a CPU 140b of a control section 10b which processes the biological information will be described in a fourth embodiment which will be described later.

A past history storage portion 124b of a storage unit 120b of the third embodiment stores not only past stay information of the user of the HMD 100b in the same manner as in the first embodiment but also purchase information such as merchandise purchased in a specific store by the user or the price of the merchandise. The purchase information is input to the past history storage portion 124b by the user performing a predetermined operation on the operation unit 135 or is stored by acquiring information regarding a credit card used in a specific store via the wireless communication unit 132.

The CPU 140b of the control section 10b includes a determination unit 162 which determines an advertisement image which will be displayed in the image display maximum region PN on the basis of captured images of the eyes and acquired biological information. The determination unit 162 performs communication with the server 300 via the wireless communication unit 132 so as to determine whether or not a position of the HMD 100b specified by the GPS module 137 is located in a specific store related to the advertisement DB 325. If it is determined that the position of the HMD 100b is located in the specific store, the determination unit 162 acquires an advertisement image of the specific store, or exhibition information as selection information regarding exhibition of merchandise via the wireless communication unit 132. In this case, the past history collation unit 166b collates the stay information and the purchase information stored in the past history storage portion 124b with each other so as to perform collation of past history of the user in the specific store corresponding to the present position of the user.

The determination unit 162 specifies a visual line direction of the user from the captured images of the eyes of the user according to according to a pattern matching method or a statistical identification method. The determination unit 162 measures a size of the pupil so as to specify a change in the size of the pupil. The determination unit 162 estimates a predicted action of the user or an intention of the user on the basis of the collation result from the past history collation unit 166b, the specified visual line direction of the user, and the size of the pupil. The determination unit 162 displays an advertisement image which is determined on the basis of the estimated action of the user or the estimated intention of the user in the image display maximum region PN. Specifically, for example, the determination unit 162 estimates that the user has an intention to purchase merchandise which is included in the past purchase history and is located near the specified visual line direction, and selects an advertisement image correlated with the merchandise. The determination unit 162 also additionally displays an advertisement image regarding a bargain in the specific store corresponding to the present position of the user in the image display maximum region PN. In the same manner as the display setting unit 165 of the first embodiment, the display setting unit 165b sets display aspects of an advertisement image which will be displayed in the image display maximum region PN or other images, and displays the images in the image display maximum region PN. The captured images of the eyes of the user and the past purchase history of the user in the third embodiment correspond to determination information in the appended claims. The determination unit 162 corresponds to a determination information acquisition unit in the appended claims.

C-2. Advertisement Display Process

Figure 17:
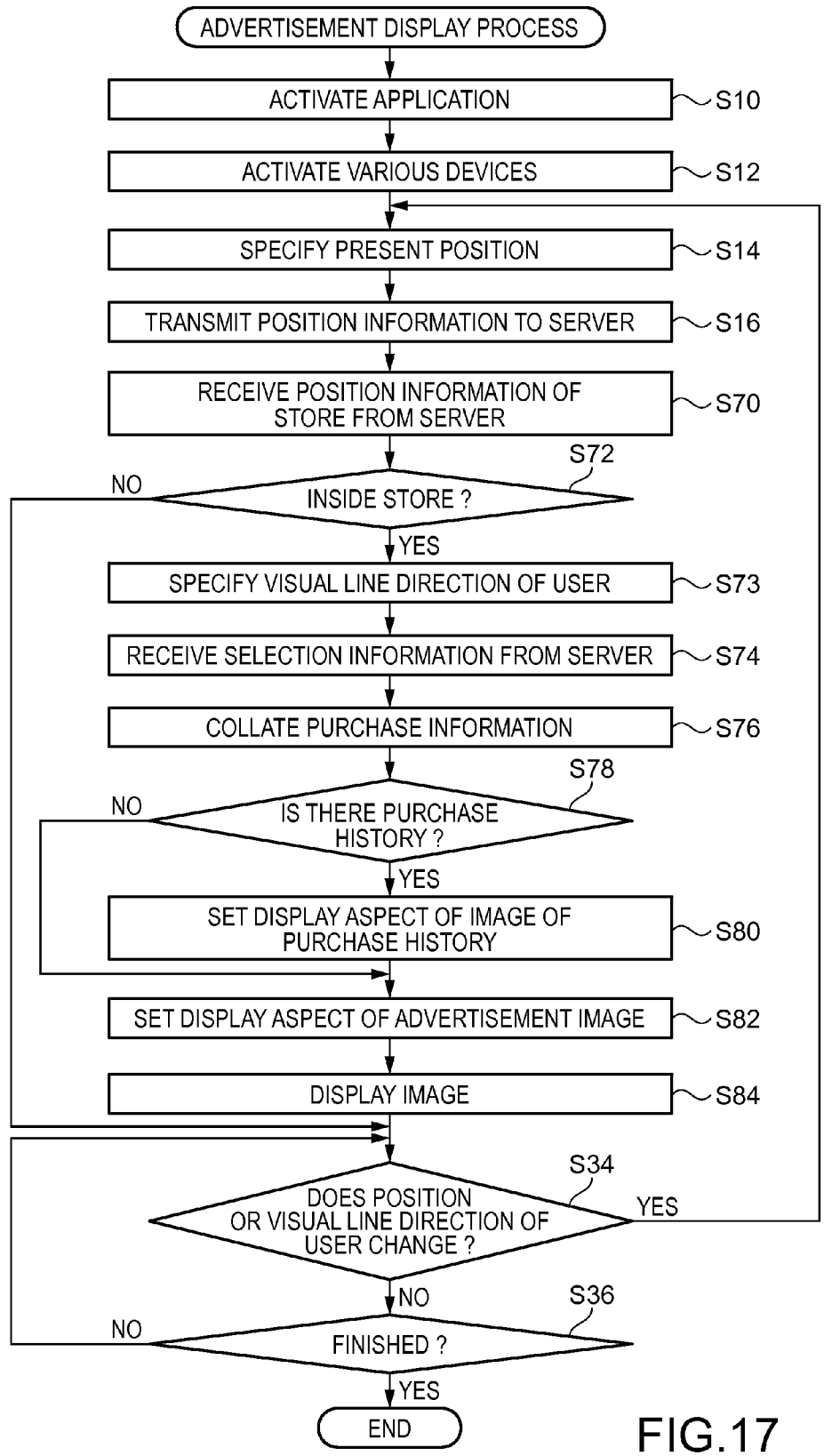
FIG. 17 is a flowchart illustrating an advertisement display process according to the third embodiment.

FIG. 17 is a flowchart illustrating an advertisement display process of the third embodiment. The advertisement display process of the third embodiment is different from the advertisement display process of the first embodiment in terms of processes in steps S70 to S84, and the remaining processes are the same as those in the advertisement display process of the first embodiment. For this reason, in the third embodiment, the processes in steps S70 to S84 which are different from those of the first embodiment will be described, and description of the remaining processes will be omitted.

If position information of the image display section 20b corresponding to position information of the user is transmitted to the server 300 via the wireless communication unit 132 in step S16 of FIG. 17, the wireless communication unit 132 receives position information of a store which is close to the image display section 20b from the server 300 (step S70). The determination unit 162 acquires position information of the store correlated with the present position of the image display section 20b via the wireless communication unit 132. The determination unit 162 determines whether or not the present position of the image display section 20b which is specified as the present position of the user is located in a specific store (step S72). If it is determined that the present position of the image display section 20b is not located in the specific store (NO in step S72), the determination unit 162 performs processes in step S34 and the subsequent steps in the same manner as in the first embodiment.

In the process in step S72, if it is determined that the present position of the image display section 20b is located in the specific store (YES in step S72), the determination unit 162 specifies a visual line direction of the user on the basis of images of the eyes captured by the eye imaging cameras 37 and 38 (step S73). The determination unit 162 receives exhibition information as selection information correlated with the specified visual line direction of the user and the specific store corresponding to the present position from the server 300 via the wireless communication unit 132 (step S74). Next, the past history collation unit 166b performs collation of the purchase information of the user stored in the past history storage portion 124b. The determination unit 162 determines whether or not merchandise exhibited near the specified visual line direction of the user is included in previous purchase history on the basis of the collation result from the past history collation unit 166b (step S78). If it is determined that there is purchase history of the merchandise exhibited near the specified visual line direction of the user (YES in step S78), the determination unit 162 estimates that the user has an intention to purchase the merchandise, determines an image correlated with the purchase history as an image to be displayed, and sets a display aspect of the image (step S80). Then, the determination unit 162 determines an advertisement image correlated with the store corresponding to the present position of the user and the purchase history, and sets a display aspect of the determined advertisement image (step S84). If it is determined in the process in step S78 that there is no purchase history of the merchandise near the visual line direction (NO in step S78), the determination unit 162 determines an advertisement image of the store corresponding to the present position of the user, and sets a display aspect of the determined advertisement image (step S82). Next, the display setting unit 165b displays an image including the advertisement image on the basis of the set display aspect in the image display maximum region PN (step S84), and repeatedly performs the processes in step S34 and the subsequent steps.

Figure 18:
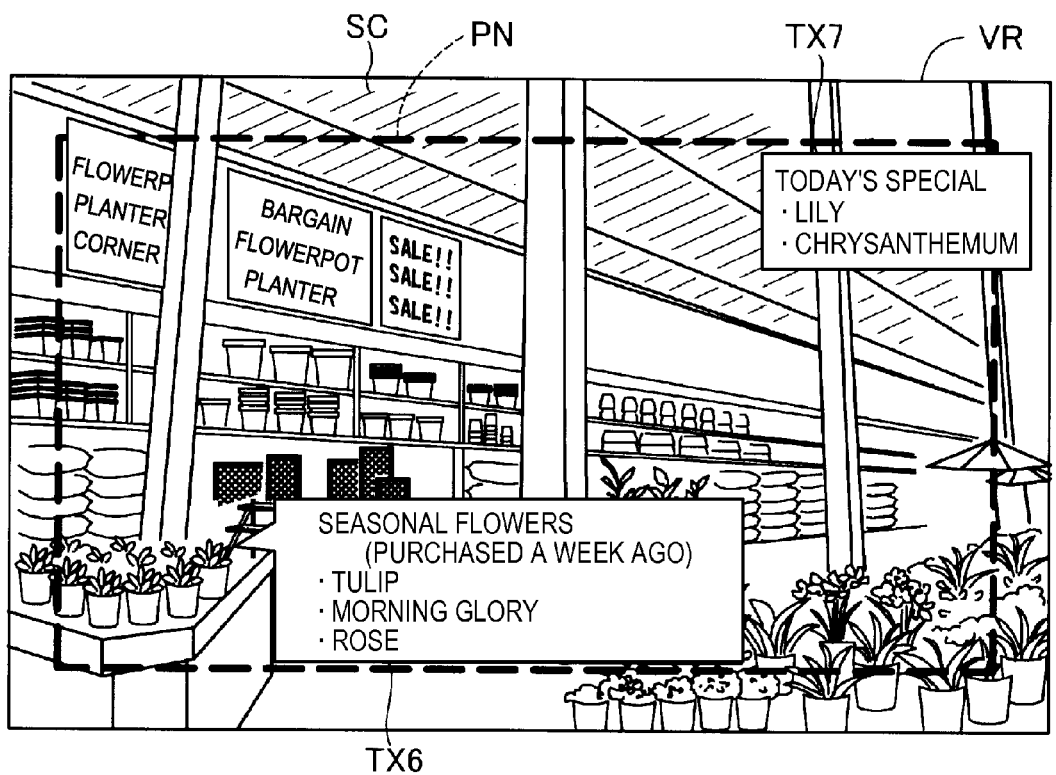
FIG. 18 is a diagram illustrating an example of a visual field which is visually recognized by the user in a case where advertisement images are displayed according to the third embodiment.

FIG. 18 is a diagram illustrating an example of a visual field VR which is visually recognized by the user in a case where advertisement images TX6 and TX7 are displayed in the third embodiment. FIG. 18 illustrates external scenery SC which is visually recognized by the user as the visual field VR and the advertisement images TX6 and TX7 in a case where the present position of the user is located at a shopping center as a specific store, and a visual line direction of the user is directed toward a "flower" sales area in the shopping center. The advertisement image TX6 is a text image which is correlated with purchase history and is displayed in the image display maximum region PN. The advertisement image TX6 shows that there is history of the user purchasing flowers stored in the advertisement DB 325 as "seasonal flowers" a week ago, and the names of three kinds of flowers which are registered in advance as the "seasonal flowers" in the present shopping center, that is, "tulip", "morning glory", and "rose". The advertisement image TX7 is an image which shows advertisement information which is stored in the advertisement DB 325 and is correlated with the "flower" sales area of the shopping center as text in the image display maximum region PN. The advertisement image TX7 advertises a "lily" and a "chrysanthemum" which are two kinds of flowers as today's specials in the shopping center.

In the third embodiment, the display setting unit 165b displays the advertisement image TX6 correlated with purchase history related to personal information of the user around the center of the image display maximum region PN as a position where the advertisement image is displayed in the image display maximum region PN. The display setting unit 165b displays the advertisement image TX6 which is a part of advertisement information transmitted from the advertisement DB 325 at positions other than the center of the image display maximum region PN on the basis of the present position of the user. In other embodiments, a position where an advertisement image is displayed in the image display maximum region PN may be variously modified on the basis of the type of advertisement image. The advertisement images TX6 and TX7 in the third embodiment correspond to images as determination information correspondence information in the appended claims.

As described above, in the HMD 100b of the third embodiment, the determination unit 162 displays the advertisement image TX6 illustrated in FIG. 18 in the image display maximum region PN on the basis of the collation result from the past history collation unit 166b and the specified visual line direction of the user. In the HMD 100b of the third embodiment, since purchase history included in personal information of the user is referred to in relation to determination of an advertisement image to be displayed in the image display maximum region PN, an advertisement image with a low degree of relation to the user is not visually recognized, and thus a user's convenience is improved.

D. Fourth Embodiment

In a fourth embodiment, the HMD 100b displays an advertisement image in the image display maximum region PN on the basis of the biological information of the user acquired by the biological information acquisition unit 39 of the image display section 20b illustrated in FIG. 16 and selection information received from the server 300. In the fourth embodiment, the biological information acquisition unit 39 is a sweat detection sensor which is attached to the skin of the user and detects sweat of the user. The human sweats if a chemical reaction of generating a lactic acid in the body occurs through muscle activity or the like. The biological information acquisition unit 39 detects the amount of sweat of the user by measuring a value of the generated lactic acid from the skin of the user.

Figure 19:
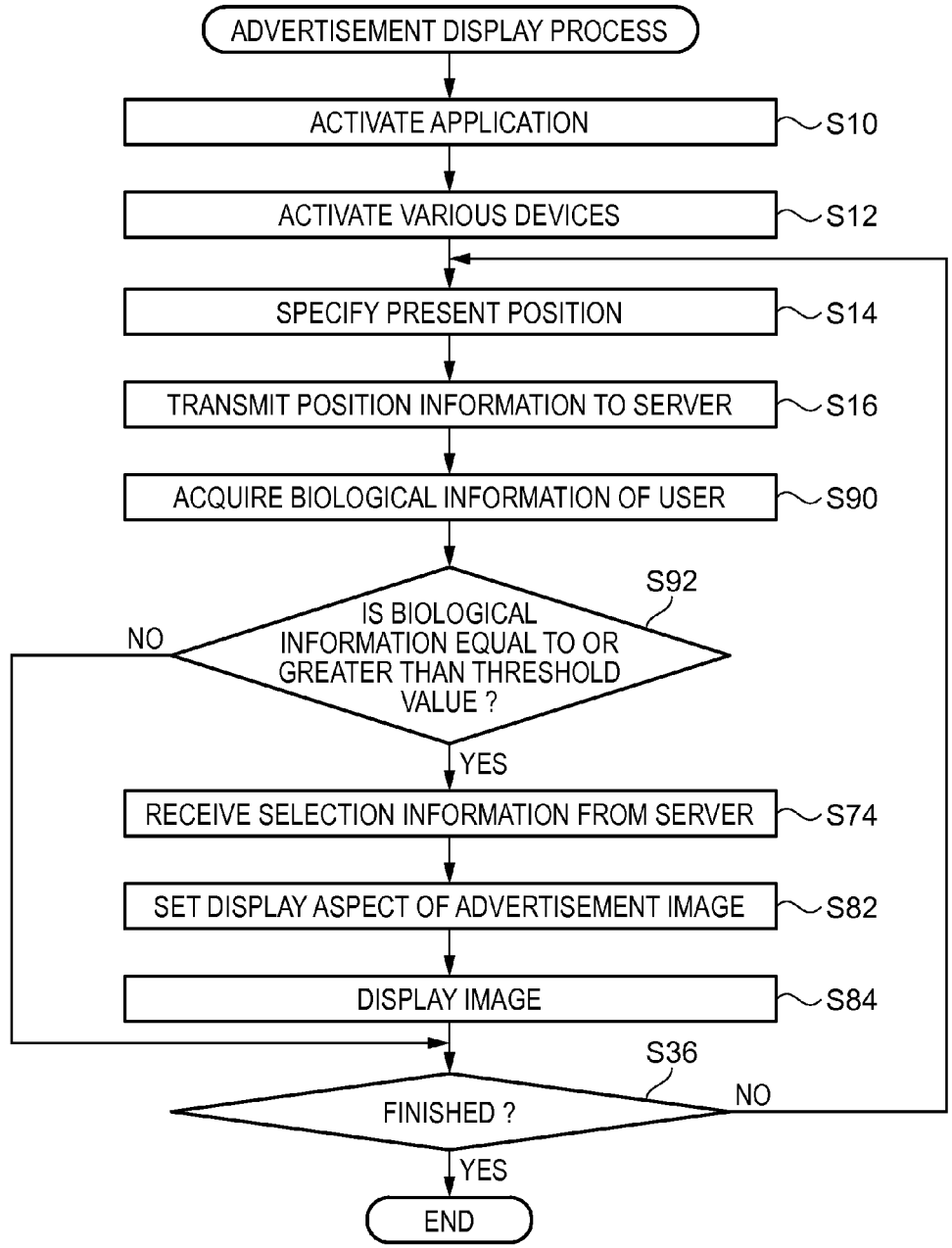
FIG. 19 is a flowchart illustrating an advertisement display process according to a fourth embodiment.

FIG. 19 is a flowchart illustrating an advertisement display process of the fourth embodiment. The advertisement display process of the fourth embodiment is different from the advertisement display process of the third embodiment illustrated in FIG. 17 in that processes in steps S90 and S92 are performed instead of the processes in steps S70 to S80, and the process in step S34 is not performed, and the remaining processes are the same as the processes in the advertisement display process of the third embodiment. For this reason, in the fourth embodiment, the processes in steps S90 to S84 which are different from those of the third embodiment will be described, and description of the remaining processes will be omitted.

If position information of the image display section 20b corresponding to position information of the user is transmitted to the server 300 via the wireless communication unit 132 in step S16 of FIG. 19, the biological information acquisition unit 39 detects sweat of the user as biological information of the user (step S90). Next, the determination unit 162 determines whether or not an amount of the detected sweat of the user is equal to or larger than a threshold value which is set in advance (step S92). If it is determined that an amount of the detected sweat of the user is not equal to or larger than the threshold value (NO in step S92), the determination unit 162 repeatedly performs the processes in step S36 and the subsequent steps in the same manner as in the first and third embodiments.

If it is determined in the process in step S92 that an amount of the detected sweat of the user is equal to or larger than the threshold value (YES in step S92), the determination unit 162 receives selection information correlated with an amount of sweat of the user which is equal to or larger than the threshold value from the server 300 (step S74). In the fourth embodiment, in a case where an amount of sweat of the user which is equal to or larger than the threshold value, the determination unit 162 estimates that the user is thirsty, and sets a display aspect of an image showing a position of a coffee shop centering on the present position of the user, an advertisement image of the coffee shop, and a position of a drink vending machine (step S82). Then, the display setting unit 165b displays an image including the advertisement image in the image display maximum region PN on the basis of the set display aspect (step S84) and repeatedly performs the processes in step S36 and the subsequent steps.

Figure 20:
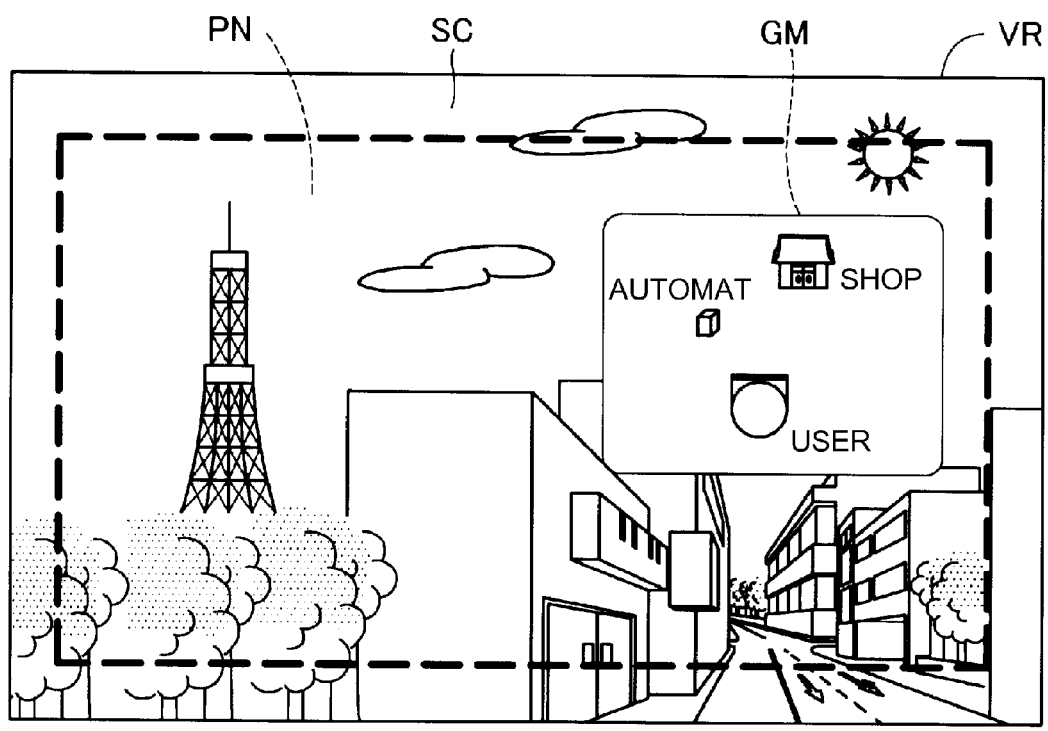
FIG. 20 is a diagram illustrating an example of a visual field which is visually recognized by the user in a case where advertisement images are displayed according to the fourth embodiment.

FIG. 20 is a diagram illustrating an example of a visual field VR which is visually recognized by the user in a case where an advertisement image GM is displayed in the fourth embodiment. FIG. 20 illustrates external scenery SC included in the visual field VR of the user who is walking and the advertisement image GM displayed in the image display maximum region PN. The advertisement image GM is a schematic image of a bird's eye view showing a positional relationship between a drink vending machine ("Automato" in FIG. 20), a coffee shop ("Shop" in FIG. 20), and the user ("User" in FIG. 20), displayed in the image display maximum region PN in a case of detecting an amount of sweat of the user which is equal to or larger than the threshold value. The determination unit 162 displays the advertisement image GM in which the position of the vending machine and the position of the coffee shop which are present within a predetermined range from the position of the user are compared with the present position of the user in the image display maximum region PN on the basis of position information of the user and the selection information received from the server 300. The advertisement image GM in the fourth embodiment corresponds to an image as determination information correspondence information in the appended claims.

As described above, in the HMD 100b of the fourth embodiment, the determination unit 162 sets the advertisement image GM to be displayed in the image display maximum region PN on the basis of an amount of sweat of the user as biological information of the user. For this reason, in the HMD 100b of the fourth embodiment, the user can visually recognize an image corresponding to a condition or the like of the user at the present time, and thus a user's convenience is improved.

E. Fifth Embodiment

A fifth embodiment is different from the third embodiment in that the determination unit 162 sets an advertisement image to be displayed in the image display maximum region PN not on the basis of purchase history as personal information of the user but on the basis of statistical information of a plurality of other users, and the remaining configurations and processes in the advertisement display process are the same as those in the third embodiment.

In the fifth embodiment, the advertisement DB 325 of the server 300 stores statistical information of a plurality of other users who are humans other than the user. Examples of the statistical information may include the number of people entering an amusement park per hour, or a waiting time for a ride such as a roller coaster.

Figure 21:
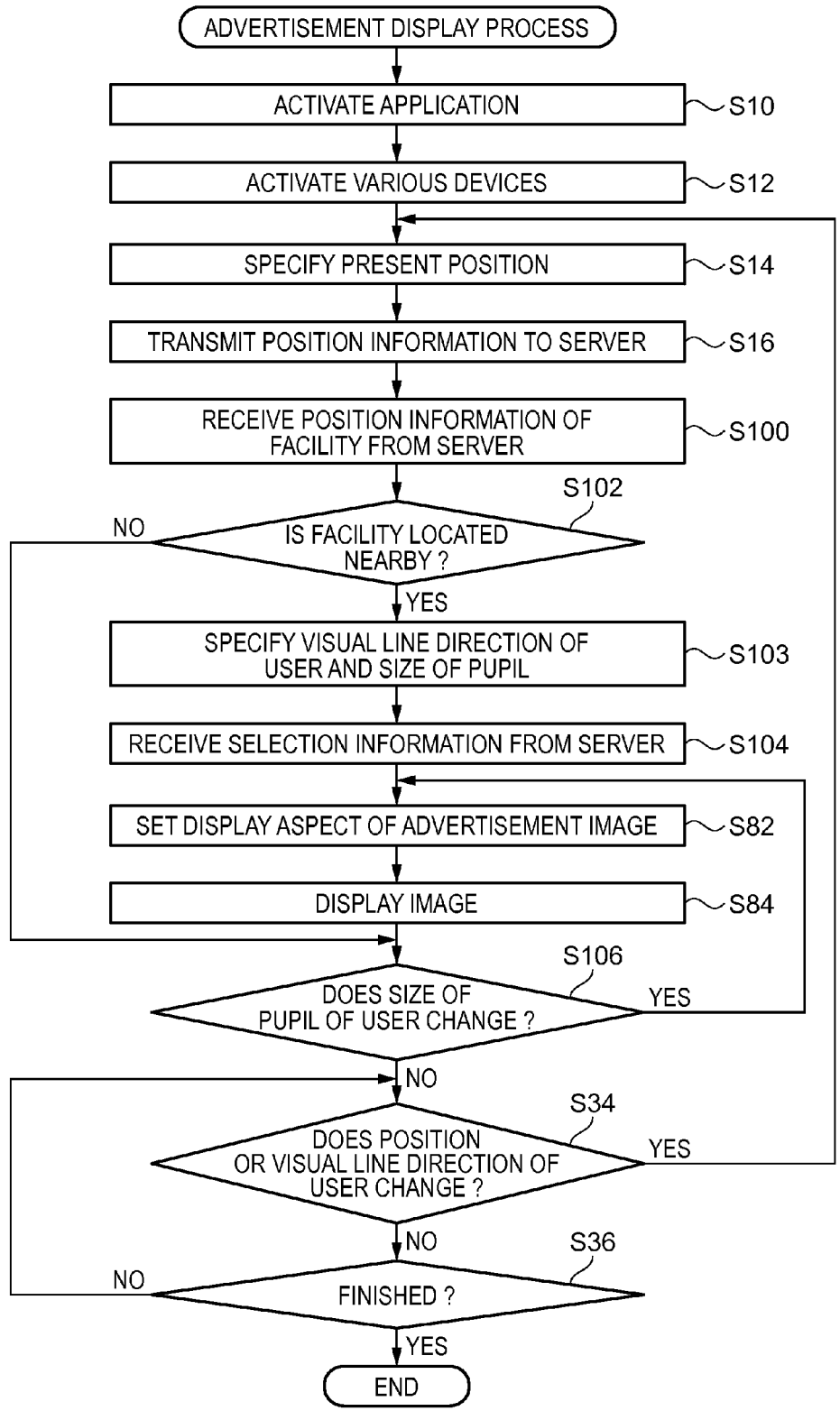
FIG. 21 is a flowchart illustrating an advertisement display process according to a fifth embodiment.

FIG. 21 is a flowchart illustrating an advertisement display process of the fifth embodiment. The advertisement display process of the fifth embodiment is different from the advertisement display process of the third embodiment illustrated in FIG. 17 in that processes in steps S100 to S106 are performed, and the remaining processes are the same as the processes in the advertisement display process of the third embodiment. Specifically, the advertisement display process of the fifth embodiment is different from the advertisement display process of the third embodiment illustrated in FIG. 17 in that the present position of the user is located not in the shopping center as a specific store but in front of a tourist spot information board, and an advertisement image to be displayed in the image display maximum region PN is set not on the basis of purchase information but on the basis of statistical information. For this reason, in the fifth embodiment, processes in steps S100 to S84 including processes which are different from those in the advertisement display process of the third embodiment will be described, and the remaining processes will be omitted.

If position information of the image display section 20b corresponding to position information of the user is transmitted to the server 300 via the wireless communication unit 132 in step S16 of FIG. 21, position information of various facilities including a store or a signboard located near the image display section 20b is received from the server 300 (step S100). The determination unit 162 specifies a positional relationship with a facility which is closest to the present position of the user via the wireless communication unit 132 (step S102). If it is specified that the present position of the user is located in front of an information board of a tourist spot which is one of the various facilities (YES in step S102), the determination unit 162 specifies a visual line direction and a size of the pupil by using images of the eyes captured by the eye imaging cameras 37 and 38 (step S103). The determination unit 162 receives selection information correlated with the information of the tourist spot as a detected signboard from the server 300 via the wireless communication unit 132 (step S104). The determination unit 162 sets a display aspect of an advertisement image to be displayed in the image display maximum region PN on the basis of the selection information received from the server 300 and the specified visual line direction of the user (step S82). Then, the display setting unit 165b displays the advertisement image in the image display maximum region PN on the basis of the set display aspect (step S84).

Figure 22:
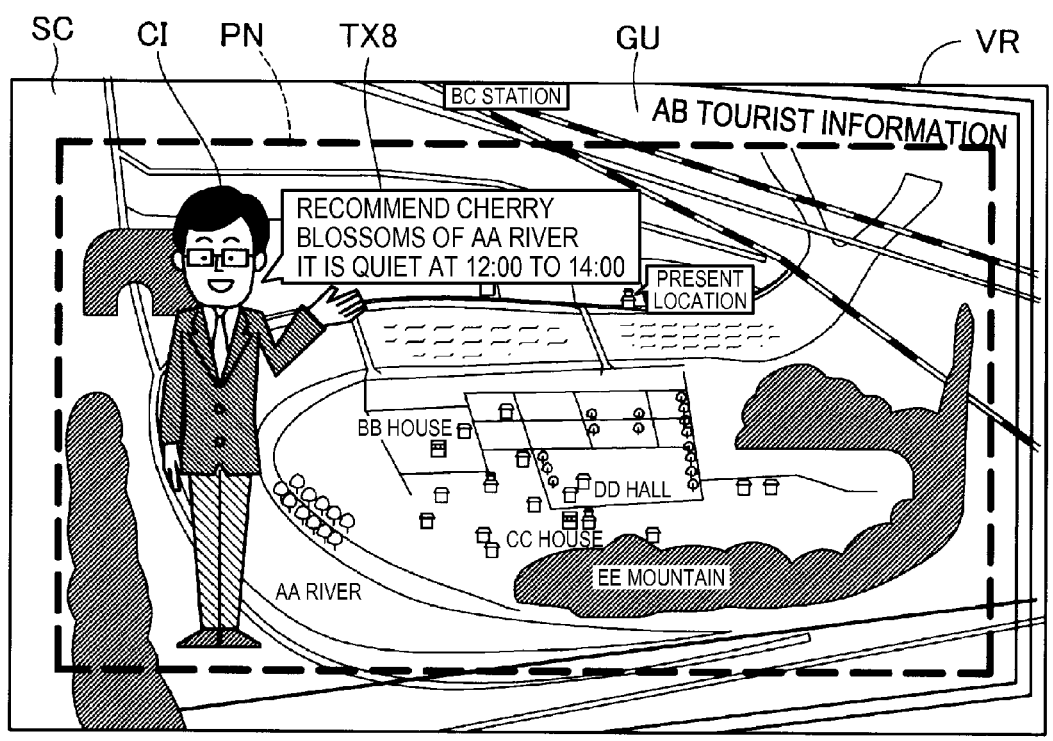
FIG. 22 is a diagram illustrating an example of a visual field which is visually recognized by the user in a case where advertisement images are displayed according to the fifth embodiment.

FIG. 22 is a diagram illustrating an example of a visual field VR which is visually recognized by the user in a case where an advertisement image TX8 is displayed in the fifth embodiment. FIG. 22 illustrates external scenery SC included in the visual field VR of the user, a guide image CI displayed in the image display maximum region PN, and the advertisement image TX8. The external scenery SC includes an information board GU which is actually visually recognized by the user. In the fifth embodiment, the information board GU which is a detected signboard is correlated with the guide image CI and the advertisement image TX8 as advertisement images. The guide image CI is an image showing a concierge as a guide at a tourist spot shown on the information board GU. The advertisement image TX8 is a text image showing a recommended tourist spot based on statistical information which is created on the basis of history of other users stored in the advertisement DB 325. The statistical information in the fifth embodiment corresponds to determination information in the appended claims, and the guide image CI and the advertisement image TX8 correspond to images as determination information correspondence information in the appended claims.

In the process in step S84 of FIG. 21, if the guide image CI and the advertisement image TX8 are displayed in the image display maximum region PN, the determination unit 162 determines whether or not a size of the pupil of the user changes on the basis of captured images of the eyes of the user (step S106). If it is determined that the change in a size of the pupil of the user is detected not to be equal to or greater than a threshold value (NO in step S106), the determination unit 162 repeatedly performs the processes in step S34 and the subsequent steps in the same manner as in the third embodiment.

If it is determined in the process in step S106 that the change in a size of the pupil of the user is detected to be equal to or greater than the threshold value (YES in step S106), in the fifth embodiment, the determination unit 162 estimates that the user has become interested in an image or a real object located in the visual line direction of the user, and resets a display aspect of an advertisement image to be displayed in the image display maximum region PN (step S82). Specifically, the determination unit 162 displays an image correlated with an object (for example, "AA river" in FIG. 22) located in the visual line direction of the user to become larger, or displays specific information associated with the object in the image display maximum region PN.

As described above, in the HMD 100b of the fifth embodiment, the determination unit 162 sets an advertisement image to be displayed in the image display maximum region PN on the basis of statistical information which is based on a plurality of humans other than the user. For this reason, in the HMD 100b of the fifth embodiment, the user can visually recognize an advertisement image using statistical information of other humans in relation to a tourist spot which the user has never visited or a location regarding which the user has only a little bit of information, and thus a user's convenience is improved.

In the HMD 100b of the fifth embodiment, the determination unit 162 estimates the extent of interest of the user on the basis of a change in a size of the pupil of the user, and sets an advertisement image to be displayed in the image display maximum region PN, and thus a user's convenience is further improved.

F. Sixth Embodiment

A sixth embodiment is different from the third embodiment in that the determination unit 162 sets an advertisement image to be displayed in the image display maximum region PN on the basis of external sound acquired by the microphone 63, and the remaining configurations and processes are the same as those in the third embodiment. In the sixth embodiment, when the user is talking with a friend who is a separate human, the determination unit 162 displays an advertisement image associated with content which is estimated to be requested by the user and the friend in the image display maximum region PN on the basis of a word which frequently appears during conversation or the time at which the conversation occurs. For example, in a case where a "meal" and a word which is highly associated with the "meal" are acquired during conversation between the user and the friend in the evening, the determination unit 162 displays an advertisement image of a neighboring restaurant or bar for eating a "meal" in the image display maximum region PN.

Figure 23:
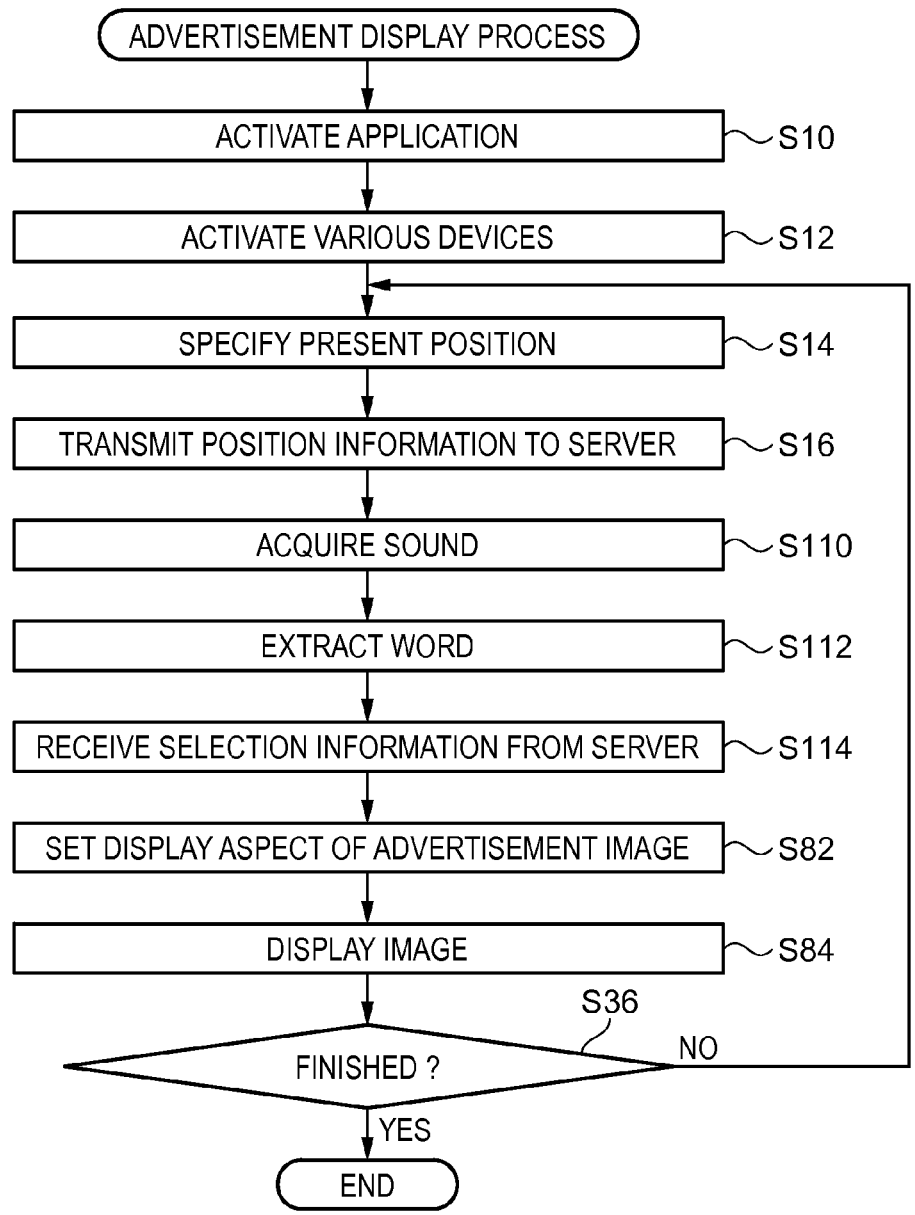
FIG. 23 is a flowchart illustrating an advertisement display process according to a sixth embodiment.

FIG. 23 is a flowchart illustrating an advertisement display process of the sixth embodiment. The advertisement display process of the sixth embodiment is different from the advertisement display process of the third embodiment in that processes in steps S110 and S114 are performed, and the remaining processes are the same as the processes in the third embodiment. For this reason, in the sixth embodiment, processes in steps S110 to S84 including processes which are different from those in the advertisement display process of the third embodiment will be described, and description of the remaining processes will be omitted.

If the process in step S16 of FIG. 23 is performed, the microphone 63 acquires external sound (step S110). The determination unit 162 identifies a word which is set in advance from the acquired external sound, and extracts the word (step S112). The determination unit 162 receives selection information which is highly associated with the extracted word from the server 300 via the wireless communication unit 132 according to the number of extracted words (step S114). The determination unit 162 sets a display aspect of an advertisement image which is to be displayed in the image display maximum region PN and is included in the received selection information (step S82). The display setting unit 165b displays the advertisement image in the image display maximum region PN on the basis of the set display aspect (step S84).

Figure 24:
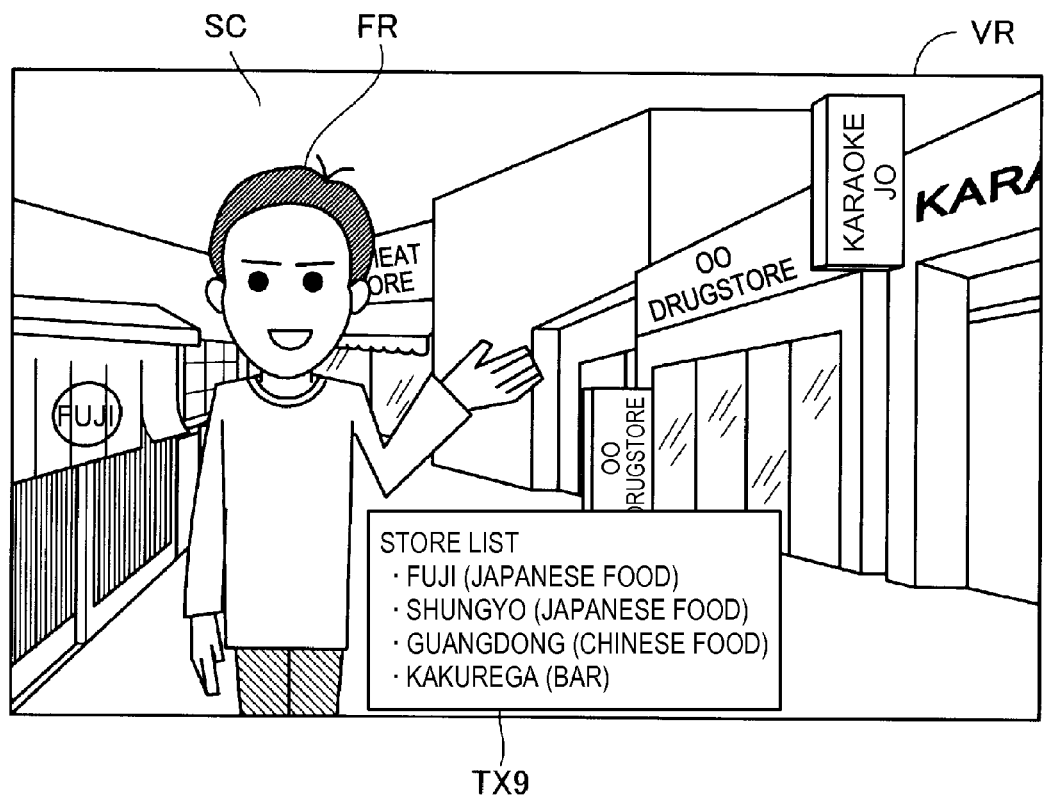
FIG. 24 is a diagram illustrating an example of a visual field which is visually recognized by the user in a case where advertisement images are displayed according to the sixth embodiment.

FIG. 24 is a diagram illustrating an example of a visual field VR which is visually recognized by the user in a case where an advertisement image TX9 is displayed in the sixth embodiment. FIG. 24 illustrates the advertisement image TX9 displayed in the image display maximum region PN and the visual field VR including external scenery SC in a case where words which are frequently extracted from sound acquired by the microphone 63 are "meal", "fish", and "Japanese food". In the sixth embodiment, the determination unit 162 displays a text image showing a list of stores for eating a meal as the advertisement image TX9 in the image display maximum region PN on the basis of the words extracted from conversation between the user and a friend FR. The advertisement image TX9 shows a list of stores including a Japanese store whose name is "Fuji", a Japanese store whose name is "Shungyo", a Chinese store whose name is "Guangdong", and a bar whose name is "Kakurega". The acquired sound in the sixth embodiment corresponds to determination information in the appended claims, and the advertisement image TX9 corresponds to determination information correspondence information in the appended claims.

As described above, in the HMD 100b of the sixth embodiment, the determination unit 162 sets an advertisement image to be displayed in the image display maximum region PN on the basis of words extracted from acquired sound. For this reason, in the HMD 100b of the sixth embodiment, information which is estimated to be desired by the user is automatically displayed in the image display maximum region PN as the advertisement image TX9 on the basis of the sound, and thus a user's convenience is further improved.

G. Modification Examples

The invention is not limited to the above-described embodiments, and may be implemented in various aspects within the scope without departing from the spirit thereof. For example, the following modification examples may also occur.

G-1. Modification Example 1

In the above-described embodiments, a direction of the image display section 20 is specified on the basis of a position of the image display section 20 specified by the GPS module 137 and a signboard image detected from an image captured by the camera 61, but a method of specifying a direction of the image display section 20 may be variously modified. For example, an azimuth sensor and an acceleration sensor may be mounted in the image display section 20, and a direction of the image display section 20 may be specified on the basis of the present position of the image display section 20, directions of east, west, south, and north specified by the azimuth sensor, and a direction relative to the gravity direction, specified by the acceleration sensor. In the HMD 100 of this modification example, even if there is an obstacle (for example, an automobile) which temporarily blocks the visual field of the user, an image correlated with a signboard detected when there is no obstacle can be displayed on the image display section 20. Since only an image correlated with a signboard which is not visually recognized by the user is displayed on the image display section 20, the user can visually recognize images correlated with a signboard which is visually recognized as a real object and a signboard which is not visually recognized as a real object and can thus acquire information in a wide range.

In the above-described embodiments, an example of the store-based advertisement data SD (FIG. 3) or the stay information VD (FIG. 5) has been described, but items of the store-based advertisement data SD and the stay information VD are not limited to the items of the above-described embodiments and may be variously modified. For example, as an example of an item of the store-based advertisement data SD, a limitation based on humidity or age may be included. The past history storage portion 124 of the storage unit 120 may store a frequency with which an advertisement image was displayed on the image display section 20 of the user, a visit frequency of a store, the number of retrievals of a store using the wireless communication unit 132, or the like, instead of the stay information VD of the user. The storage unit 120 may store not only past information of the user but also personal information such as sex, hobbies, an address, and the kind of job, and the display setting unit 165 may set an advertisement image to be displayed on the image display section 20 on the basis of the stored personal information.

In the above-described embodiments, a distance from the image display section 20 to a position of a detected signboard is measured on the basis of the present position of the image display section 20 acquired by the GPS module 137 and the position of the detected signboard, but a method of measuring a distance between the present position of the image display section 20 and the position of the detected signboard may be variously modified. For example, an infrared light emitting unit and an infrared light receiving unit may be disposed near the camera 61 of the image display section 20 as the distance measurement unit 161, and the distance measurement unit 161 may measure a distance between a target reflecting infrared light and the image display section 20 by the infrared light receiving unit receiving the infrared light emitted by the infrared light emitting unit.

In the above-described embodiments, the operation unit 135 performs various operations on the HMD 100 on the basis of a signal for sound recognized by the sound processing unit 170, but may perform control other than the operations on the basis of the signal for the recognized sound. For example, the display setting unit 165 may set an advertisement image to be displayed on the image display section 20 on the basis of a signboard detected from a captured image and recognized sound. Specifically, in a case where the sound "hungry" is recognized, the display setting unit 165 displays advertisement information correlated with a detected signboard in which a category in the store-based advertisement data SD is only "food" on the image display section 20 or displays the advertisement information on the image display section 20 in an emphasized manner through blinking or the like.

In the second embodiment, the calibration setting unit 167 displays the setting image CG on the image display section 20a and performs calibration setting by using the index finger FF of the right hand HD detected in the captured image IMG, but the setting image CG or the index finger FF may be variously modified. For example, the calibration setting unit 167 may display a single large circular image on the image display section 20a as the setting image CG and may perform the calibration setting on the basis of a displayed trajectory of the circle and a detected trajectory of the index finger FF. As a specific target object detected by the calibration setting unit 167, not the index finger FF of the right hand HD but the control section 10a which is correlated with the HMD 100a in a one-to-one relationship may be used, or a ballpoint pen may be used.

G-2. Modification Example 2

In the above-described embodiments, the present position of the image display section 20 is specified by the GPS module 137, and then the wireless communication unit 132 of the HMD 100 receives selection information from the server 300, but a method for transmission and reception of information between the HMD 100 and the server 300 may be variously modified. For example, in a case where the present position of the image display section 20 is specified, and a signboard image is detected from a captured image, the wireless communication unit 132 may transmit the position information of the image display section 20 and information regarding the detected signboard image to the server 300 and may receive advertisement information correlated with the detected signboard from the server 300. In the HMD 100 of this modification example, since advertisement information stored in the server 300 is not stored in the control section 10 as in the selection information storage portion 122 of the storage unit 120 of the above-described embodiment, the storage capacity of the control section 10 may be small, and thus the HMD 100 can be miniaturized.

In the above-described embodiments, the wireless communication unit 132 of the HMD 100 performs transmission and reception of information with a server such as the server 300, and thus the control section 10 acquires an image of a signboard and advertisement information correlated with the signboard, but a method of acquiring advertisement information or the like may be variously modified. For example, the storage unit 120 of the control section 10 may store an image of a signboard and advertisement information correlated with the signboard, and each unit of the control section 10 may perform an advertisement display process by using the stored image of the signboard and advertisement information. The image of the signboard and the advertisement information may be acquired from an external storage device which is connected via a USB interface. In the HMD 100 of this modification example, transmission and reception of information with other information terminals such as the wireless communication unit 132 are not performed, and thus the HMD 100 can be miniaturized.

G-3. Modification Example 3

In the above-described embodiments, an example of a display aspect of an advertisement image which is displayed on the image display section 20 by the display setting unit 165 has been described, but a display aspect set by the display setting unit 165 may be variously modified. For example, in the second embodiment, the display setting unit 165 may display the advertisement image TX5 or the like correlated with the advertisement image TX4 on which a calibration operation is performed by the user in the vicinity of the center of the image display maximum region PN, and may increase the luminance of the BLs 221 and 222 to be higher than the luminance before the operation is performed. In a case where the user performs a calibration operation on the advertisement image TX4 displayed in the image display maximum region PN, since there is less necessity of transmission of the external scenery SC, it is possible to improve a user's convenience by increasing the luminance of the BLs 221 and 222.

In a case where there are a plurality of detected signboards belonging to the same category in the store-based advertisement data SD, the display setting unit 165 may display the detected signboards one by one in the image display maximum region PN so that the user can easily compare the signboards with each other. The display setting unit 165 may set fonts of a text image displayed in the image display maximum region PN to the same font or may set colors of outer frames to the same color and may display advertisement images belonging to the same category.

The display setting unit 165 may switch images between an image displayed on the right optical image display unit 26 and an image displayed on the left optical image display unit 28, so as to form a convergence angle, and may display an advertisement image so that the user can recognize the advertisement image displayed on the image display section 20 as a three-dimensional image. For example, the display setting unit 165 may set a position of an advertisement image which is displayed in a three-dimensional manner on the image display section 20 to the same distance as a distance measured by the distance measurement unit 161. The display setting unit 165 may display only an advertisement image correlated with a store of which a use frequency is highest to the user in a three-dimensional manner by referring to the stay information VD, and thus the advertisement image can be visually recognized by the user in an emphasized manner.

In the above-described embodiments, the signboard detection unit 168 detects a signboard image from an image captured by the camera 61, but the signboard detection unit 168 may detect an identification target image on the basis of information other than an image captured by the camera 61. For example, the signboard detection unit 168 may detect an image included in information detected by an infrared sensor, an ultrasonic sensor, or a radar, as an identification target image.

G-4. Modification Example 4

Figure 25:
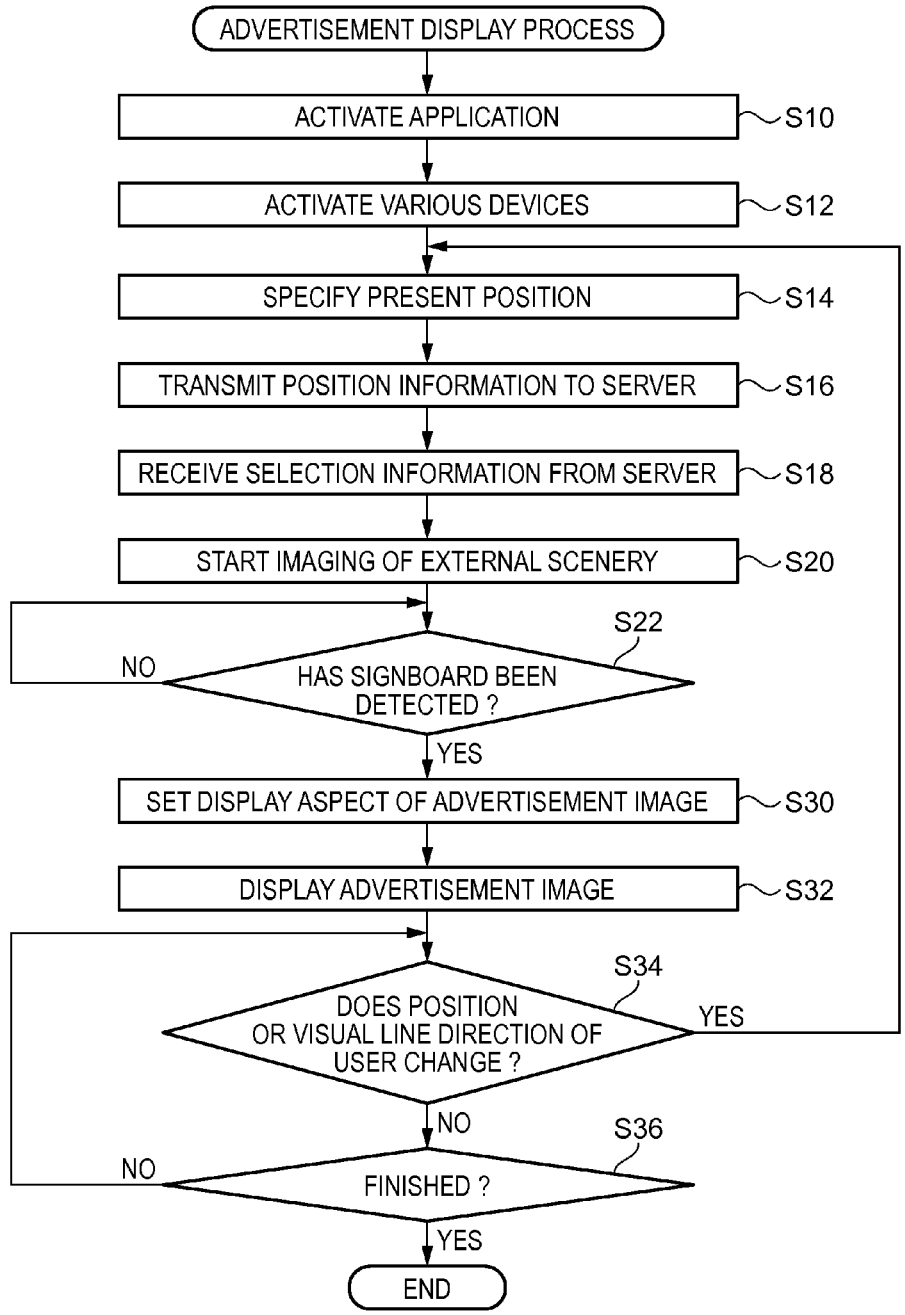
FIG. 25 is a flowchart illustrating an advertisement display process according to a modification example.

As for the advertisement display process of the first embodiment, in the processes in steps S24 to S32 of FIG. 7, various information pieces such as a distance are acquired, and an advertisement image is displayed on the image display section 20 on the basis of the acquired information, but the various acquired information pieces may be variously modified. FIG. 25 is a flowchart illustrating an advertisement display process of the modification example. In the advertisement display process illustrated in FIG. 25, the processes in steps S24 to S28 of FIG. 7 are omitted. As mentioned above, in the advertisement display process, a distance between the image display section 20 and a detected signboard may not be measured, environmental information such as temperature may not be acquired, and a relationship between the stay information VD and a detected signboard may not be collated.

In the above-described embodiments, an advertisement image is displayed on the image display section 20 on the basis of the present position of the image display section 20 specified by the GPS module 137 and selection information which is transmitted from the server 300 on the basis of the specified present position, but a method of acquiring an advertisement image may be variously modified. For example, a transmission unit such as i-Beacon (registered trademark) which transmits the store-based advertisement data SD of a store correlated with a signboard as optical information may be disposed not in the server 300 but in the signboard. In this case, the HMD 100 may include a reception unit which receives the optical information transmitted from the signboard, and the signboard detection unit 168 may acquire a detected signboard by collating an image of the signboard included in the optical information received by the reception unit with the signboard detected by the camera 61. The HMD 100 may specify a position thereof on the basis of network information which is acquired via a wireless LAN by using the wireless communication unit 132. The HMD 100 may specify a position thereof by specifying a characteristic building which is registered as a landmark included in imaged external scenery. The HMD 100 may specify a position thereof by receiving information from a server which stores data on an address or a specific intersection via the wireless communication unit 132. In this modification example, a position of the image display section 20 is not required to be acquired by the GPS module 137, and thus convenience for the user of the HMD 100 is improved.

In the above-described embodiments, an image of a detected signboard has been described as an example of an image corresponding to an identification target image in the appended claims, but an identification target image may be variously modified. For example, the identification target image may be an image such as a sign constituted of text, a figure, a symbol, and a stereoscopic shape, and may be an image including a combination of a shape, a pattern, and a color of an article having a specific exterior. In the above-described embodiments, the advertisement images TX1 and TX2 have been described as examples of images corresponding to determination information correspondence information in the appended claims, but determination information correspondence information and an image as the determination information correspondence information may be variously modified. For example, an image as the determination information correspondence information may be an image of a time table correlated with a signboard of a station, and may be an image showing related information such as a route map correlated with a signboard or a mark of a bus stop, a stop which a bus will reach next, and a fare for each getting-off stop. The determination information correspondence information may be sound or the like other than an image.

G-5. Modification Example 5

In the third embodiment, past purchase information of the user has been described as an example of personal information of the user stored in the past history storage portion 124b, but personal information of the user may be variously modified. Examples of personal information of the user may include web history in which the user performed retrieval using the Internet, and history of conversation between the user and other persons.

In the embodiments from the third embodiment to the sixth embodiment, the determination unit 162 estimates an intention or an action of the user on the basis of acquired determination information, but an action or the like of the user estimated by the determination unit 162 may be variously modified. The determination unit 162 may estimate, for example, a lying state or a sitting state as an action state of the user, and may estimate a state in which the user is riding on a car or a state in which the user is running as a movement state of the user. The determination information is triggering information for displaying an image of advertisement or the like in the image display maximum region PN, and may be information other than a signboard, past history of the user, external sound, statistical information of other users, and biological information of the user, described in the above embodiments. For example, if the operation unit 135 receives a predetermined operation, the user may freely set determination information.

In the fourth embodiment, sweat of the user has been described as an example of biological information acquired by the biological information acquisition unit 39, but biological information acquired by the biological information acquisition unit 39 may be variously modified. The biological information acquisition unit 39 may acquire, for example, body temperature, blood pressure, heart rate, respiration rate, an electroencephalograph, blood flow, and blood sugar level of the user. The biological information acquisition unit 39 is a sensor which acquires such biological information, and may be provided integrally with or separately from the HMD 100. The HMD 100 of the modification example may not be provided with the biological information acquisition unit 39 and may acquire biological information of the user which is acquired by other apparatuses, via the wireless communication unit 132.

In the sixth embodiment, the determination unit 162 sets an advertisement image to be displayed in the image display maximum region PN on the basis of external sound acquired by the microphone 63 and position information of the user, but may set the advertisement image to be displayed in the image display maximum region PN on the basis of external information other than external sound. The determination unit 162 may set the advertisement image to be displayed in the image display maximum region PN on the basis of for example, a video of external scenery SC, a smell, or weather in addition to the position information of the user. In order to implement such a function, the HMD 100 may be provided with a camera which images the external scenery SC, a smell sensor which specifies an external smell, a temperature sensor, a humidity sensor, and an atmospheric pressure sensor for determining weather, and an ambient light sensor.

Display information correlated with position information in the appended claims naturally includes, for example, information regarding a store located within a predetermined range from a position of the HMD 100 included in acquired position information, but may include other information. For example, the acquired position information may be information regarding a store located within a predetermined range from a position at which the user of the HMD 100 arrives at a predetermined later time (for example, one hour later) as a position which is different from the present position of the HMD 100. The acquired position information may be information regarding a tourist facility located within a predetermined range from a trajectory through which the user of the HMD 100 will pass within a predetermined time (for example, within 30 minutes). The acquired position information may be information for specifying a position of another user of the HMD 100.

A display aspect of an image as determination information correspondence information displayed in the image display maximum region PN is not limited to the examples described in the above embodiments, and may be variously modified. For example, a display aspect of a display image may be various settings of an image, such as a display position, a display timing (for example, a single image is displayed for several seconds), luminance suitable for illuminance of external scenery, two-dimensional or three-dimensional display, a distance at which the user performs visual recognition in a case where the three-dimensional display is performed, and enlargement or reduction of a specific image.

G-6. Modification Example 6

In the above-described embodiments, the operation unit 135 is provided in the control section 10, but an aspect of the operation unit 135 may be variously modified. For example, there may be an aspect in which a user interface corresponding to the operation unit 135 may be provided separately from the control section 10. In this case, the operation unit 135 is separate from the control section 10 provided with the power supply 130 and the like, and can thus be miniaturized, thereby improving a user's operability. The camera 61 is disposed in the image display section 20, but the camera 61 may be provided separately from the image display section 20 and may capture an image of the external scenery SC.

For example, the image light generation unit may include an organic electroluminescence (EL) display and an organic EL controller. For example, the image light generation unit may use liquid crystal on silicon (LCOS; LCoS is a registered trademark), a digital micromirror device or the like instead of the LCD. For example, the invention is applicable to a laser retinal projective HMD 100.

The HMD 100 may be implemented in an aspect in which the optical image display units cover only part of the eyes of the user; in other words, the optical image display units do not completely cover the eyes of the user. For example, the HMD 100 may be a monocular head mounted display. The HMD 100 is of a binocular optical transmission type, but the invention is also applicable to head mounted displays of other types such as a video transmission type.

The earphone may employ an ear-mounted type or a head band type, or may be omitted. For example, the HMD may be configured to be mounted in a vehicle such as an automobile or an airplane. For example, the HMD may be configured to be built into a body protection tool such as a helmet.

G-7. Modification Example 7

A configuration of the HMD 100 in the above-described embodiments is only an example and may be variously modified. For example, the direction key 16 provided in the control section 10 may be omitted, or other operation interfaces such as an operation stick may be provided in addition to the direction key 16 or the track pad 14. The control section 10 may be configured to be connected to an input device such as a keyboard or a mouse and may receive an input operation from the keyboard or the mouse.

As the image display section, instead of the image display section 20 which is mounted like spectacles, image display sections of other types, such as an image display section which is mounted like a cap, may be employed. The earphones 32 and 34 may be omitted as appropriate. In the above-described embodiments, the LCD and the light source are used as a configuration for generating image light, but, alternatively, other display elements such as an organic EL display may be employed.

Figure 26A:
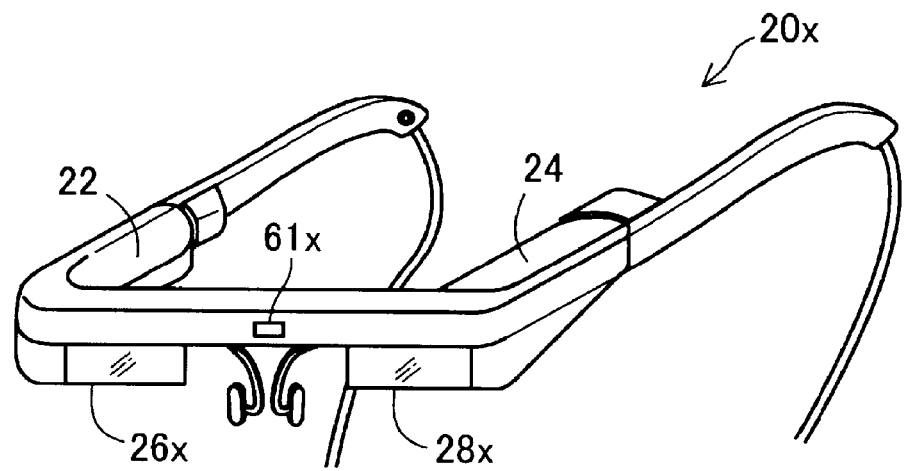
FIGS. 26A and 26B are diagrams illustrating exterior configurations of an HMD in modification examples.
Figure 26B:
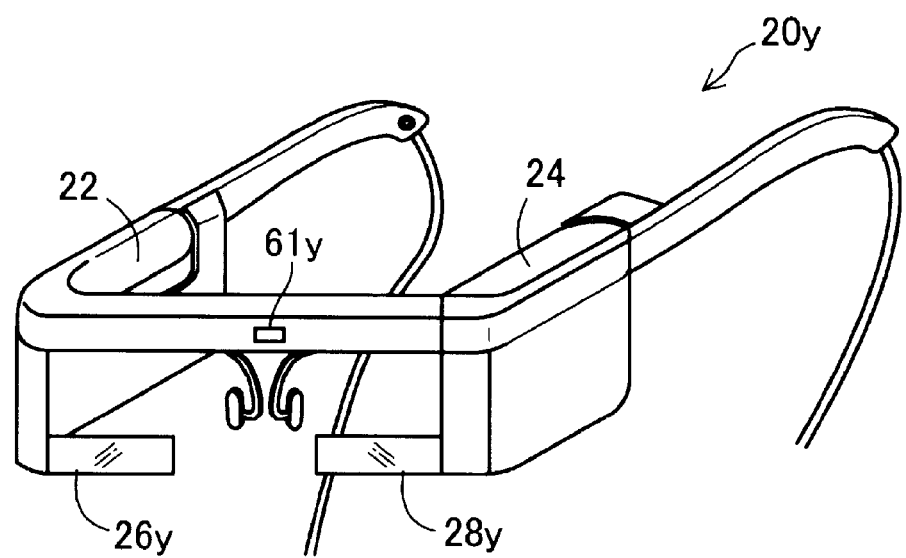

FIGS. 26A and 26B are diagrams illustrating exterior configurations of HMDs in modification examples. In an example illustrated in FIG. 26A, there are differences from the HMD 100 illustrated in FIG. 1 in that an image display section 20*x* includes a right optical image display unit 26*x* instead of the right optical image display unit 26 and a left optical image display unit 28*x* instead of the left optical image display unit 28. The right optical image display unit 26*x* is formed to be smaller than the optical members of the above-described embodiments, and is disposed on the obliquely upper side of the right eye of the user when an HMD 100*x* is mounted. Similarly, the left optical image display unit 28*x* is formed to be smaller than the optical members of the above-described embodiments, and is disposed on the obliquely upper side of the left eye of the user when the HMD 100*x* is mounted. In an example of FIG. 26B, there are differences from the HMD 100 illustrated in FIG. 1 in that an image display section 20*y* includes a right optical image display unit 26*y* instead of the right optical image display unit 26 and a left optical image display unit 28*y* instead of the left optical image display unit 28. The right optical image display unit 26*y* is formed to be smaller than the optical members of the above-described embodiments, and is disposed on the obliquely lower side of the right eye of the user when the HMD is mounted. The left optical image display unit 28*y* is formed to be smaller than the optical members of the above-described embodiments, and is disposed on the obliquely lower side of the left eye of the user when the HMD is mounted. As mentioned above, the optical image display units have only to be disposed near the eyes of the user. Any size of the optical member forming the optical image display units may be used, and the HMD 100 may be implemented in an aspect in which the optical image display units cover only part of the eyes of the user; in other words, the optical image display units do not completely cover the eyes of the user.

In the above-described embodiments, the HMD 100 may guide image light representing the same image to the right and left eyes of the user so that the user visually recognizes a two-dimensional image, or may guide image light representing different images to the right and left eyes of the user so that the user visually recognizes three-dimensional images.

In the above-described embodiments, some of the constituent elements implemented by hardware may be implemented by software, and, conversely, some of the constituent elements implemented by software may be implemented by hardware. For example, in the above-described embodiments, the image processing unit 160 or the sound processing unit 170 is implemented by the CPU 140 reading and executing a computer program, but such functional units may be implemented by a hardware circuit.

In a case where some or all of the functions of the invention are implemented by software, the software (computer program) may be provided in a form of being stored on a computer readable recording medium. In the invention, the "computer readable recording medium" is not limited to a flexible disc or a portable recording medium such as a CD-ROM, and includes internal storage devices of a computer, such as a RAM or a ROM, and external storage devices such as a hard disk fixed to a computer.

In the above-described embodiments, as illustrated in FIGS. 2 and 3, the control section 10 and the image display section 20 are provided as separate configurations, but configurations of the control section 10 and the image display section 20 are not limited thereto and may be variously modified. For example, all of the constituent elements of the control section 10 may be provided in the image display section 20, or some of the constituent elements may be provided therein. The power supply 130 of the above-described embodiments may be formed alone so as to be exchangeable, and the constituent elements provided in the control section 10 may also be provided in the image display section 20. For example, the CPU 140 illustrated in FIG. 2 may be provided in both the control section 10 and the image display section 20, and functions performed by the CPU 140 provided in the control section 10 and a CPU provided in the image display section 20 may be separate from each other.

The invention is not limited to the above-described embodiments or modification examples, and may be implemented using various configurations within the scope without departing from the spirit thereof. For example, the embodiments corresponding to technical features of the respective aspects described in Summary of Invention and the technical features in the modification examples may be exchanged or combined as appropriate in order to solve some or all of the above-described problems, or in order to achieve some or all of the above-described effects. In addition, if the technical feature is not described as an essential feature in the present specification, the technical feature may be deleted as appropriate.

The entire disclosure of Japanese Patent Application Nos. 2014-163647, filed Aug. 11, 2014 and 2015-088506, filed Apr. 23, 2015 are expressly incorporated by reference herein.

What is claimed is:

1. A transmission type head mounted display comprising:
   an image display that displays an image and through which external scenery is transmitted;
   a position information acquisition unit, executed by a processor, that acquires position information of the head mounted display;
   a determination information acquisition unit, executed by a processor, that acquires determination information used to determine whether or not an image to be displayed on the image display will be displayed based on whether a database has display information associated with an item within the image and the acquired position information of the head mounted display;

an information transmission and reception unit, executed by a processor, that receives display information which is correlated with the acquired position information and includes determination information correspondence information; and a distance measurement unit, executed by a processor, that measures a distance between a position of the head mounted display specified by the acquired position information and positions of items of the external scenery detected by a detection unit which is executed the processor;

a display image controller that (1) displays the determination information correspondence information in association with the item in the image and based on the position information, and (2) sets a display aspect of the displayed determination information correspondence information based on the measured distance, the determination information correspondence information being information about the item within the image and being correlated with the acquired determination information and is included in the received display information on the image display in a case where the determination information is acquired.

2. The head mounted display according to claim 1, wherein the determination information acquisition unit includes an image detection portion that detects an identification target image as the determination information included in the display information from the external scenery, and wherein the display image controller displays the determination information correspondence information on the image display in a case where the identification target image is detected.

3. The head mounted display according to claim 2, wherein the image detection portion images the external scenery, and wherein, in a case where the identification target image is detected from the imaged external scenery, the display image controller displays the determination information correspondence information correlated with the detected identification target image on the image display.

4. The head mounted display according to claim 2, wherein the image detection portion specifies a direction of the image display, and wherein, in a case where the identification target image is detected from the external scenery on the basis of the specified direction of the image display, the display image controller displays the determination information correspondence information correlated with the detected identification target image on the image display.

5. The head mounted display according to claim 2, further comprising:

a distance measurement unit, executed by a processor, that measures a distance between a position of the head mounted display specified by the acquired position information and a position of a signboard which is a base of the detected determination information, wherein the display image controller sets a display aspect of an image as the determination information correspondence information to be displayed on the image display on the basis of the measured distance.

6. The head mounted display according to claim 5, wherein the display image controller sets at least one of a size and a display position of an image as a display aspect of the image as the determination information correspondence information to be displayed on the image display.

7. The head mounted display according to claim 1, further comprising:

a state detection unit, executed by a processor, that detects an external environmental state of the head mounted display, wherein the display image controller displays an image as the determination information correspondence information correlated with the detected external environmental state on the image display.

8. The head mounted display according to claim 1, further comprising:

a correction unit, executed by a processor, that displays a specific image on the image display, detects an image of a specific target object in the external scenery, and corrects a positional relationship between the image displayed on the image display and the target object on the basis of the specific image and the image of the specific target object, wherein the display image controller changes an image as the determination information correspondence information displayed on the image display on the basis of a position of the image of the specific target object detected in the external scenery after the correction unit performs correction.

9. The head mounted display according to claim 1, further comprising:

a personal information storage memory that stores personal information, wherein the display image controller displays, on the image display, an image as the determination information correspondence information which is set on the basis of personal information of a user.

10. The head mounted display according to claim 9, wherein the personal information of the user is information regarding a location at which the user stayed in the past.

11. The head mounted display according to claim 1, wherein the determination information acquisition unit acquires at least one of information regarding a location at which the user stayed in the past, biological information of the user, and statistical information of other users as the determination information.

12. A transmission type head mounted display comprising:

an image display that displays an image and through which external scenery is transmitted;

a position information acquisition unit, executed by a processor, that acquires position information of the head mounted display;

an advertisement information storage memory that stores display information including an image as determination information correspondence information to be displayed on the image display;

a determination information acquisition unit, executed by a processor, that acquires determination information used to determine whether or not an image as the determination information correspondence information will be displayed based on whether a database has display information associated with an item within the image and the acquired position information of the head mounted display;

a distance measurement unit, executed by a processor, that measures a distance between a position of the head mounted display specified by the acquired position information and positions of items of the external scenery detected by a detection unit which is executed the processor; and a display image controller that (1) displays the determination information correspondence information in association with the item in the image and based on the position information, and (2) sets a display aspect of the displayed determination information correspondence information based on the measured distance, the determination information correspondence information being information about the item within the image and being correlated with the acquired determination information and is included in the received display information on the image display in a case where the determination information is acquired.

13. A transmission type head mounted display comprising:

an image display that displays an image and through which external scenery is transmitted;

a determination information acquisition unit, executed by a processor, that acquires determination information used to determine whether or not an image to be displayed on the image display will be displayed based on whether a database has display information associated with an item within the image;

an information transmission and reception unit, executed by a processor, that receives display information which includes determination information correspondence information;

a distance measurement unit, executed by a processor, that measures a distance between a position of the head mounted display and positions of items of the external scenery detected by a detection unit which is executed the processor; and a display image controller that (1) displays, on the image display, the determination information correspondence information in association with the item in the image, and (2) sets a display aspect of the displayed determination information correspondence information based on the measured distance, the determination information correspondence information being information about the item within the image and being correlated with the acquired determination information in the determination information correspondence information included in the display information in a case where the determination information is acquired.

14. An information system comprising:

an information storage device that stores and transmits information; and a transmission type head mounted display that transmits and receives information to and from the information storage device, wherein the head mounted display includes a position information acquisition unit, executed by a processor, that acquires position information of the head mounted display; and an information transmission unit, executed by a processor, that transmits the acquired position information to the information storage device, wherein the information storage device includes an information selection unit, executed by a processor, that selects display information including determination information correspondence information from the information stored in the information storage device on the basis of the position information transmitted from the information transmission unit, and a selection information transmission unit, executed by a processor, that transmits the selected display information to the head mounted display, and wherein the head mounted display further includes an image display that displays an image and through which external scenery is transmitted, a determination information acquisition unit, executed by a processor, that acquires determination information used to determine whether or not an image to be displayed on the image display will be displayed based on whether a database has display information associated with an item within the image and the acquired position information of the head mounted display, a distance measurement unit, executed by a processor, that measures a distance between a position of the head mounted display specified by the acquired position information and positions of items of the external scenery detected by a detection unit which is executed the processor, and a display image controller that (1) displays the determination information correspondence information in association with the item in the image and based on the position information, and (2) sets a display aspect of the displayed determination information correspondence information based on the measured distance, the determination information correspondence information being information about the item within the image and being correlated with the acquired determination information and is included in the received display information on the image display in a case where the determination information is acquired.

15. A control method for a transmission type head mounted display including an image display that displays an image and through which external scenery is transmitted, and an information reception unit that receives information, the method comprising:

causing a computer to acquire position information of the head mounted display;

receive display information which is correlated with the acquired position information and includes determination information correspondence information;

acquire determination information used to determine whether or not an image to be displayed on the image display will be displayed based on whether a database has display information associated with an item within the image and the acquired position information of the head mounted display; and display the determination information correspondence information in association with the item in the image and based on the position information, and set a display aspect of the displayed determination information correspondence information based on the measured distance, the determination information correspondence information being information about the item within the image and being correlated with the acquired determination information and is included in the received display information on the image display in a case where the determination information is acquired.

16. A non-transitory computer readable medium embodying a computer program for a transmission type head mounted display, the transmission type head mounted display including an image display that displays an image and through which external scenery is transmitted, and the program causing a computer to implement:
- a position specifying function of acquiring position information of the head mounted display;
- an information transmission and reception function of receiving display information which is correlated with the acquired position information and includes determination information correspondence information;
- a determination information acquisition function of acquiring determination information used to determine whether or not an image to be displayed on the image display unit will be displayed based on whether a database has display information associated with an item within the image and the acquired position information of the head mounted display; and
- a display image control functions of (1) displaying the determination information correspondence information in association with the item in the image, which is information about the item within the image and based on the position information, and (2) setting a display aspect of the displayed determination information correspondence information based on the measured distance, the determination information correspondence information being information about the item within the image and being correlated with the acquired determination information and is included in the received display information on the image display in a case where the determination information is acquired.

* * * * *